US012452300B2

United States Patent
St. Pierre et al.

(10) Patent No.: US 12,452,300 B2
(45) Date of Patent: Oct. 21, 2025

(54) SYSTEMS AND METHODS FOR PROTECTING DNS SERVERS FROM WATER TORTURE DDOS ATTACKS

(71) Applicant: NetScout Systems, Inc., Westford, MA (US)

(72) Inventors: Brian St. Pierre, Acworth, NH (US); Steinthor Bjarnason, Fjerdinby (NO)

(73) Assignee: NetScout Systems, Inc., Westford, MA (US)

( * ) Notice: Subject to any disclaimer, the term of this patent is extended or adjusted under 35 U.S.C. 154(b) by 172 days.

(21) Appl. No.: 18/464,605

(22) Filed: Sep. 11, 2023

(65) Prior Publication Data
US 2025/0088531 A1     Mar. 13, 2025

(51) Int. Cl.
*H04L 9/40* (2022.01)
*H04L 43/0894* (2022.01)
*H04L 47/263* (2022.01)
*H04L 61/4511* (2022.01)

(52) U.S. Cl.
CPC ...... *H04L 63/1458* (2013.01); *H04L 43/0894* (2013.01); *H04L 47/263* (2013.01); *H04L 61/4511* (2022.05); *H04L 63/1416* (2013.01); *H04L 63/1425* (2013.01)

(58) Field of Classification Search
CPC ............. H04L 63/1458; H04L 43/0894; H04L 47/263; H04L 61/4511; H04L 63/1416; H04L 63/1425; H04L 63/0281; H04L 2463/142; H04L 63/1408
See application file for complete search history.

(56) References Cited

U.S. PATENT DOCUMENTS

| | | | | |
|---|---|---|---|---|
| 8,661,522 B2* | 2/2014 | Huston, III | ......... | H04L 63/1458 726/13 |
| 11,019,022 B1* | 5/2021 | Thornewell | ......... | H04L 67/1001 |
| 11,658,995 B1* | 5/2023 | Arora | .................. | H04L 63/101 726/23 |

(Continued)

OTHER PUBLICATIONS

Hasegawa, Keita, et al. "Collaborative defense framework using FQDN-based allowlist filter against DNS water torture attack." IEEE Transactions on Network and Service Management 20.4 (2023): 3968-3983. Date of Publication: May 19, 2023.*

(Continued)

*Primary Examiner* — Jimmy H Tran
(74) *Attorney, Agent, or Firm* — Foley & Lardner LLP

(57) ABSTRACT

A system is disclosed. The system can include a network monitoring device connected to a communications network. The network monitoring device to store a probabilistic data structure indicating one or more domain names; receive a response data packet from the DNS server, the response data packet comprising a first domain name transmitted in a query to the DNS server and an affirmative response code; update the probabilistic data structure with the first domain name identified from the response data packet; responsive to detecting an attack on the network, retrieve a query message, the query message containing a second domain name; query the updated probabilistic data structure with the second domain name; and restrict transmission of the query message or communication by the computing device with the DNS server.

20 Claims, 10 Drawing Sheets

(56) References Cited

U.S. PATENT DOCUMENTS

| | | | | |
|---|---|---|---|---|
| 2013/0291101 | A1* | 10/2013 | Karasaridis | G06F 21/00 |
| | | | | 726/22 |
| 2014/0059216 | A1* | 2/2014 | Jerrim | H04L 67/104 |
| | | | | 709/224 |
| 2014/0325634 | A1* | 10/2014 | Iekel-Johnson | H04L 63/101 |
| | | | | 726/13 |
| 2017/0041332 | A1* | 2/2017 | Mahjoub | H04L 43/0876 |
| 2017/0041333 | A1* | 2/2017 | Mahjoub | H04L 43/0876 |
| 2018/0063084 | A1* | 3/2018 | Wakumoto | H04L 45/42 |
| 2018/0152468 | A1* | 5/2018 | Nor | H04L 63/1425 |
| 2018/0183830 | A1* | 6/2018 | Wessels | H04L 63/1458 |
| 2018/0302435 | A1* | 10/2018 | Koster | H04L 43/0876 |
| 2020/0145454 | A1* | 5/2020 | Galliano | H04L 61/4511 |
| 2020/0204581 | A1* | 6/2020 | Manadhata | H04L 61/4511 |
| 2021/0250332 | A1* | 8/2021 | Moore | H04L 61/4511 |
| 2021/0344651 | A1* | 11/2021 | Joshi | H04L 12/4641 |
| 2021/0344714 | A1* | 11/2021 | Yang | H04L 61/103 |
| 2021/0400061 | A1* | 12/2021 | Antoniewicz | H04L 61/4511 |
| 2022/0166692 | A1* | 5/2022 | Burton | H04L 43/0817 |
| 2022/0294815 | A1* | 9/2022 | Martini | H04L 63/1441 |
| 2023/0362207 | A1* | 11/2023 | St. Pierre | H04L 63/1458 |
| 2024/0259345 | A1* | 8/2024 | Moore | H04L 63/20 |
| 2024/0333755 | A1* | 10/2024 | Rodriguez | H04L 63/1441 |
| 2025/0071092 | A1* | 2/2025 | Moore | H04L 63/0263 |

OTHER PUBLICATIONS

Zhauniarovich, Yury, et al. "A survey on malicious domains detection through DNS data analysis." ACM Computing Surveys (CSUR) 51.4 (2018): 1-36.*

Bilge, Leyla, et al. "Exposure: A passive dns analysis service to detect and report malicious domains." ACM Transactions on Information and System Security (TISSEC) 16.4 (2014): 1-28.*

Bilge, Leyla, et al. "Exposure: Finding Malicious Domains Using Passive DNS Analysis." Ndss. 2011.*

EP Partial Search Report dated Jan. 31, 2025 in European Patent Application No. 24195649.9.

Hasegawa et al., "Collaborative Defense Framework Using FQDN-Based Allowlist Filter Against DNS Water Torture Attack", (2023) IEEE Transactions On Network and Service Management, vol. 20, No. 4, pp. 3968-3983.

EP Extended Search Report dated Apr. 23, 2025 in European Patent Application No. 24195649.9.

* cited by examiner

SYSTEMS AND METHODS FOR PROTECTING DNS SERVERS FROM WATER TORTURE DDOS ATTACKS

BACKGROUND

Distributed denial of service (DDOS) attacks are used by malicious actors to deny access to a given network service. A certain class of DDOS attacks that deny access to domain name system (DNS) services are called "Water Torture" attacks. These attacks involve sending queries to DNS servers, where the queries will result in error responses. These queries are harmful to the DNS servers because domain names of legitimate queries will usually be in the server's cache and can be efficiently processed. Domain names of malicious queries may not be in a cache of the DNS server and may cause the DNS server to perform extra processing and possibly extra network requests. This additional processing and network traffic can cause the DNS server to fail, thus causing legitimate queries to go unanswered.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
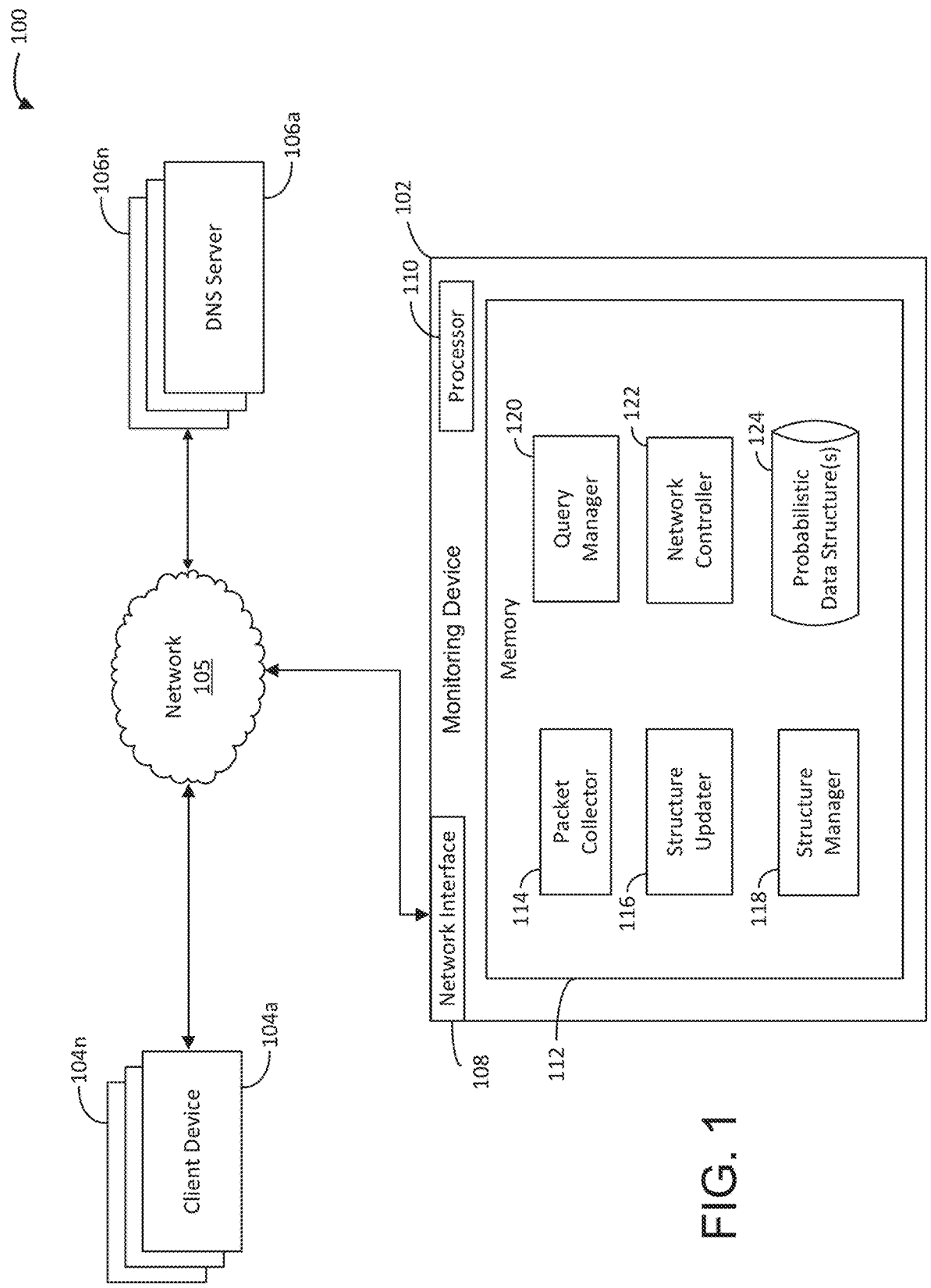
FIG. 1 is an illustration of a DNS server protection system, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As mentioned above, domain name system (DNS) servers are susceptible to water torture distributed denial of service (DDOS) attacks. Broadly speaking there are two types of DNS servers: authoritative and recursive. Authoritative servers are responsible for serving queries for a specific domain or set of domains. Recursive servers are responsible for handling direct queries from clients for any domain, making queries to authoritative servers, caching the answers, and providing the authoritative answer back to the client.

Conventional "countermeasures" that help to protect a DNS server that is under attack have drawbacks. Normally a DNS server would process almost all queries as user datagram protocol (UDP) queries, which are lightweight and simple to process. However, using a "DNS Authentication" countermeasure may force many clients to perform transmission control protocol (TCP) queries, which tends to increase certain resource usage on a DNS server.

Conventional systems may have features for protecting authoritative servers that allow an operator to upload a set of known domains into memory. When an attack is underway, the operator can toggle a switch of a system that rejects queries for names that are not contained in the set of known domains.

An additional DDOS attack class involves a spoofed response flood. This attack is carried out against recursive servers. Since recursive servers may perform queries from authoritative servers, they await responses from those authoritative servers. An attacker can send a large volume of fake responses to the (victim) recursive server. The recursive server may process every response to figure out which ones are real responses and which ones are fake. It is difficult to configure countermeasures to filter out fake responses and prevent them from reaching the victim.

A computer implementing the systems and methods described herein can protect DNS servers from the aforementioned DDOS attacks. For example, a computer, such as a monitoring device, may protect one or more DNS servers. The monitoring device may be positioned in front of a DNS server and monitor network traffic sent to and from the DNS server. The monitoring device may collect DNS response packets that are transmitted by the DNS server. When a response packet contains an affirmative response (e.g., the query was for a known name) then the monitoring device may extract the queried name (e.g., domain name) from the response packet and insert the queried name into a probabilistic data structure. Responsive to detecting an attack on the network or the DNS server the monitoring device is monitoring, the monitoring device can change into a mode in which incoming DNS queries (e.g., DNS requests) are intercepted and conditionally forwarded to the DNS server. For each query, the probabilistic data structure can be tested for the presence of the domain name in the DNS query. If the domain name in the DNS query is "possibly in the set," then the monitoring device can forward the DNS query to the DNS server. If the domain name is "definitely not in the set", then further countermeasures may be applied. Examples of such countermeasures can include, but may not be limited to, DNS authentication, rate limiting, or regular expression filtering. In some embodiments, the countermeasures may involve dropping the DNS queries. In this way, the monitoring device can leverage monitoring techniques that the monitoring device performs to validate DNS queries before the DNS queries reach the DNS server being queried, thus reducing the processing resources required for the DNS server to respond to queries of an attack.

The computer may use a probabilistic data structure to store the domain names in the DNS queries. Examples of such probabilistic data structures may include a cuckoo filter or a bloom filter. Upon querying the probabilistic data structure for a specific domain name, the computer may determine the specific domain name "is possibly stored in the probabilistic data structure" or the domain name "is definitely not stored in the probabilistic data structure." The false positive probability can be a fixed percentage based on configuration parameters of the probabilistic data structure.

Using a probabilistic data structure to store domain names instead of a deterministic data structure can have multiple advantages in performing the systems and methods described herein. For example, using a probabilistic data structure can improve space efficiency, which can be useful given the high number of domain names that may need to be stored. Probabilistic data structures may also be faster to query, which may be useful given the high number of queries the monitoring device may receive and the speed that is considered acceptable in responding to such requests. In one example, a probabilistic data structure can be configured to have a false probability percentage (FPP) of 3%. In this configuration, the system may require about 7 bits per entry for storage in a cuckoo filter. Thus, 1 million entries can be stored in less than 1 MiB of memory, or approximately 83 MiB for 100M entries. This may be an easily manageable amount of memory for modern software platforms, and a sufficient filter capacity for large DNS deployments.

A problem with using probabilistic data structures for DNS protection is that the data in the probabilistic data structures may grow stale, and thus may be unreliable. However, an inherent property of probabilistic data structures may be that it can be difficult to delete individual stale entries of the probabilistic data structures. To address this technical problem, the monitoring device may maintain two filters, which may be labeled as "current" and "previous." Periodically, the monitoring device may delete the probabilistic data structures labeled as previous and update the label of the current probabilistic data structures to have the previous label. The monitoring device may generate a new, empty probabilistic data structure upon deleting and relabeling the two probabilistic data structures, labeling the new probabilistic data structure as current. When learning new domain names, the monitoring device may insert the new domain names in the probabilistic data structure labeled as current. When intercepting queries, the monitoring device may check both the current and the previous probabilistic data structures to determine if the domain names of the queries are in either probabilistic data structure. Thus, any stale domain name may only persist in memory of the monitoring device for twice as long as the creation interval.

In some embodiments, the monitoring device may be configured to perform the process in reverse. For example, the monitoring device may be configured to protect recursive servers from a flood of malicious error responses. To protect a recursive server, the monitoring device may avoid passing bad responses to the DNS server. In doing so, the monitoring device may observe outbound requests and insert domain names from the outbound requests into a probabilistic data structure. Then, when an attack is detected, the monitoring device can intercept inbound responses, check if domain names of the responses are in the probabilistic data structure, and drop the inbound responses if the domain names are not in the probabilistic data structure. In some embodiments, the monitoring device may use DNS transaction identifiers and user datagram protocol (UDP) source/destination ports from DNS outbound responses and intercepted inbound responses to protect the recursive servers instead of domain names. In performing the process in this way, the monitoring device may perform aging (e.g., using any of the methods described above) more quickly because the valid set of domain names may change more rapidly when protecting a recursive server from a response flood than when protecting an authoritative server from a request flood.

In some embodiments, the monitoring device may be configured to protect authoritative servers using a static name configuration. In doing so, the monitoring device may not populate any probabilistic data structures based on names extracted from outbound responses. Instead, the monitoring device may use a user-provided set of domain names that are populated into the probabilistic data structure. The monitoring device may facilitate the loading of that set of names by performing an authoritative transfer or a similar transaction from a DNS server. When using a static name configuration, the monitoring may not perform any aging technique on the set of domain names. Instead, the monitoring device may update the set of domain names with any updates that are input by a user. In updating the set of domain names, the monitoring device may discard the previous or non-updated set of domain names.

FIG. 1 illustrates an example DNS server protection system 100 for protecting DNS servers from DDOS attacks, in some embodiments. The system 100 may protect DNS servers from malicious queries intended to overload the processing resources of DNS servers. In brief overview, the system 100 can include a monitoring device 102 that receives or retrieves data packets transmitted via a network 105 between client devices 104a-n (hereinafter client device 104 or client devices 104) and DNS servers 106a-n (hereinafter DNS server 106 or DNS servers 106). Client devices 104 can communicate with the DNS servers 106 via the network 105. The DNS servers 106 can each include a set of one or more servers 802, depicted in FIG. 8A, or a data center 808. The monitoring device 102 can intercept data packets transmitted by the DNS servers 106 intended for the client devices 104 and data packets transmitted by the client devices 104 intended for the DNS servers 106. The monitoring device 102 can monitor data packets transmitted between the client devices 104 and the DNS servers 106 in both directions, the outbound direction in which the monitoring device 102 collects data packets transmitted in responses from the DNS servers 106, and the inbound direction in which the monitoring device 102 collects data packets transmitted by the client devices 104 intended for the DNS servers 106. The monitoring device 102 can store domain names identified from response data packets from the DNS server 106 in a probabilistic data structure. The monitoring device 102 can compare the domain names in queries from the client device 104 with the probabilistic data structure. The monitoring device 102 can restrict transmission of queries for domain names that the monitoring device 102 determines are not in the probabilistic data structure. The monitoring device 102 may forward queries for which the monitoring device 102 identifies a matching domain name in the probabilistic data structure to the DNS server 106. In this way, the monitoring device 102 can ensure the DNS server 106 only processes data of queries of domain names for which the DNS server 106 has previously affirmatively responded, reducing the impact of DDOS attacks involving queries for domain names that do not exist.

The monitoring device 102, the client devices 104, and the DNS servers 106, can include or execute on one or more processors or computing devices (e.g., the computing device 803 depicted in FIG. 8C) and/or communicate via the network 105. The network 105 can include computer networks such as the Internet, local, wide, metro, or other area networks, intranets, satellite networks, and other communication networks such as voice or data mobile telephone networks. The network 105 can be or include a 5G network or any other type of network. The network 105 can be used to access information resources such as web pages, websites, domain names, or uniform resource locators that can be presented, output, rendered, or displayed on at least one computing device (e.g., client device 104), such as a laptop, desktop, tablet, personal digital assistant, smartphone, portable computers, or speaker. For example, via the network 105, the client devices 104 can query the DNS servers 106 with domain names or otherwise communicate with the DNS servers 106. In some embodiments, the network 105 may be or include a self-organizing network that implements a machine learning model to automatically adjust connections and configurations of network elements of the network 105 to optimize network connections (e.g., minimize latency, reduce dropped calls, increase data rate, increase quality of service, etc.).

Each of the monitoring device 102, the client devices 104, and the DNS servers 106 can include or utilize at least one processing unit or other logic device such as programmable logic array engine, or module configured to communicate with one another or other resources or databases. The components of the monitoring device 102, the client devices 104, and/or the DNS servers 106 can be separate components or a single component. The system 100 and its components can include hardware elements, such as one or more processors, logic devices, or circuits.

Still referring to FIG. 1, and in further detail, the system 100 can include the DNS servers 106. The DNS servers 106 can be computers that are designed to translate domain names, which are human-readable, into IP addresses, which are used for routing data over the Internet and other networks. This translation process allows users to access websites and other online resources using easily remembered domain names (e.g., "example.com") instead of having to memorize numeric IP addresses (e.g., "192.0.2.1"). The DNS servers 106 can operate by receiving a domain name query from a client device 104, looking up the corresponding IP address in a local database, and then responding back to the client device 104 with the IP address. In some cases, if a DNS server 106 does not have an IP address in its database, the DNS server 106 may query other DNS servers 106 (e.g., in a hierarchical manner) until identifying the correct IP address. The DNS servers 106 can translate one name to another, respond to a query with arbitrary text, or perform zone transfers, in addition to other capabilities.

The client devices 104 can include or execute applications (e.g., browsers) to communicate with the DNS servers 106. In doing so, the client devices 104 can transmit queries to the DNS servers 106 for device identifiers (e.g., IP addresses) of devices that host websites associated with specific domain names. For example, a user of a client device 104 can input a domain name into an application executing on the client device 104. The client device 104 can transmit a query to a DNS server 106 for an IP address that corresponds with the input domain name. The DNS server 106 can receive the query and identify an IP address from memory that corresponds with the input domain name. The DNS server 106 can transmit a response data packet back to the client device 104 including the IP address and, in some cases, the input domain name. The DNS server 106 can include an affirmative response code in the response that indicates the IP address could be found. The client device 104 can then use the IP address to communicate with a computing device associated with the IP address. The computing device can provide the website associated with the domain name to the client device 104, thus enabling the user to access the website associated with the domain name.

The monitoring device 102 may comprise one or more processors that are configured to collect data packets transmitted between the client devices 104 and the DNS servers 106. The monitoring device 102 may comprise a network interface 108, a processor 110, and/or memory 112. The monitoring device 102 may communicate with any of the client devices 104 and/or the DNS servers 106 via the network interface 108. The processor 110 may be or include an ASIC, one or more FPGAs, a DSP, circuits containing one or more processing components, circuitry for supporting a microprocessor, a group of processing components, or other suitable electronic processing components. In some embodiments, the processor 110 may execute computer code or modules (e.g., executable code, object code, source code, script code, machine code, etc.) stored in the memory 112 to facilitate the operations described herein. The memory 112 may be any volatile or non-volatile computer-readable storage medium capable of storing data or computer code. The monitoring device 102 may be positioned in front of one or more of the DNS servers 106. The monitoring device 102 can monitor network traffic sent to and from the DNS servers 106. The monitoring device 102 can block certain packets from passing to the DNS servers 106 based on decisions made by the monitoring device 102.

The memory 112 may include a packet collector 114, a structure updater 116, a structure manager 118, a query manager 120, a network controller 122, and/or one or more probabilistic data structures 124, in some embodiments. In brief overview, the components 114-122 may collect data packets of DNS replies (e.g., responses to DNS queries transmitted by the client devices 104 to the DNS servers 106) from the DNS servers 106. The components 114-122 can generate a probabilistic data structure 124 from the domain names in the DNS replies. The components 114-122 may collect data packets of DNS queries transmitted by the client devices 104 intended for the DNS servers 106. The components 114-122 can detect an attack on the network 105. Responsive to detecting the attack, the components 114-122 can use the domain names of the DNS queries to query the probabilistic data structure. Responsive to determining a domain name of a DNS query is not represented or stored in the probabilistic data structure, the components 114-122 can restrict transmission of the DNS query or communication by the client device 104 that transmitted the DNS query.

The packet collector 114 may comprise programmable instructions that, upon execution, cause the processor 110 to receive or collect data (e.g., data packets) transmitted between the client devices 104 and the DNS servers 106. The packet collector 114 may receive, retrieve, or collect data packets that are transmitted over the network 105 between the client devices 104 and the DNS servers 106. For example, the packet collector 114 may receive or retrieve data packets of DNS queries from the client devices 104 to the DNS servers 106 and/or DNS replies (e.g., DNS responses) to such DNS queries from the DNS servers 106 to the client devices 104. The packet collector 114 may receive or retrieve such data packets while the monitoring device 102 operates as an intermediate computing device between the client devices 104 and the DNS servers 106.

The packet collector 114 may collect DNS responses from the DNS servers 106. For example, the packet collector 114 may collect and forward DNS queries from the client devices 104 to the DNS servers 106. The packet collector 114 can collect DNS responses to the DNS queries from the DNS servers 106. In some embodiments, the packet collector 114 can generate copies of the DNS responses and store the copies in memory. The packet collector 114 may forward the collected DNS responses to the client devices 104. The packet collector 114 may similarly collect DNS responses in this way over time.

In response to detecting an attack, the packet collector 114 may collect DNS queries from the client devices 104 that are intended for the DNS servers 106 for further processing. For example, the packet collector 114 can detect an attack. The attack may be an attack on the network 105 and/or an attack on one or more of the DNS servers 106. In response to detecting the attack, the packet collector 114 may perform further processing on DNS queries received during the attack to determine whether the DNS queries are a part of or otherwise associated with the attack.

In some embodiments, the packet collector 114 may perform selective further processing on DNS queries for different DNS servers 106. For example, the packet collector 114 may receive a message or input indicating a first DNS server 106 is being attacked. The packet collector 114 may not receive any message or input indicating a second DNS server 106 is being attacked. Accordingly, the packet collector 114 may perform further processing on DNS queries transmitted to the first DNS server 106 to determine if the DNS queries are associated with the attack and, concurrently, not perform further processing on DNS queries transmitted to the second DNS server 106.

The structure updater 116 may comprise programmable instructions that, upon execution, cause the processor 110 to generate and/or update a probabilistic data structure 124 based on domain names of DNS responses. For example, the structure updater 116 can parse the DNS responses that the packet collector 114 collects for a DNS server 106 to identify the domain names of the DNS responses. The structure updater 116 can parse such DNS responses as the packet collector 114 collects the DNS responses over time. The structure updater 116 can identify the domain names and store the identified domain names in the probabilistic data structure 124. In some embodiments, the structure updater 116 may only update the probabilistic data structure 124 with a domain name from a response data packet responsive to identifying an affirmative response code in the response data packet. In this way, the structure updater 116 can authenticate the domain names such that the monitoring device can validate future DNS queries that include the domain names that are stored in the probabilistic data structure 124.

The probabilistic data structure 124 can be, for example, a cuckoo filter or a bloom filter. The probabilistic data structure can include representations or indications of different domain names that the structure updater 116 parses from the collected DNS responses from the DNS servers 106. For example, the probabilistic data structure may include hash representations of domain names that the structure updater 116 parses from DNS responses in a Bloom filter or a Cuckoo filter. Representations of any number of domain names can be stored in probabilistic data structure 124.

The structure updater 116 can generate or update the probabilistic data structure 124 over time. For example, the structure updater 116 can initialize an empty probabilistic data structure (e.g., a probabilistic data structure without any representations of domain names) 124. The packet collector 114 can collect DNS response data packets from a DNS server 106 over time. The structure updater 116 can parse the collected DNS response data packets to identify domain names in the DNS response data packets. The structure updater 116 can generate representations (e.g., calculate hash values or other representations, as applicable depending on the type of the probabilistic data structure) of the domain names identified from the DNS response data packets and store the representations of the domain names in the probabilistic data structure. The structure updater 116 can update the probabilistic data structure in this way over time to maintain a list of domain names that the DNS server 106 has confirmed or authenticated in DNS responses to various client devices 104 that submit DNS queries.

The structure updater 116 can generate and/or update probabilistic data structures that are dedicated to individual DNS servers 106 and/or multiple or all of the DNS servers 106. For example, the structure updater 116 can store and maintain separate probabilistic data structures for individual DNS servers 106. The structure updater 116 can identify domain names from DNS responses transmitted by the individual DNS servers 106 and update the probabilistic data structures that correspond with the respective DNS servers 106 that transmitted the DNS responses with the identified domain names. In another example, the structure updater 116 can maintain one or more probabilistic data structures that each correspond to multiple DNS servers. The structure updater 116 can identify domain names from DNS responses transmitted by the individual DNS servers 106 and update the probabilistic data structures that correspond with the respective groups of DNS servers 106 that transmitted the DNS responses with the identified domain names. The structure updater 116 can generate and/or update probabilistic data structures for any number of DNS servers 106.

The structure manager 118 may comprise programmable instructions that, upon execution, cause the processor 110 to manage the probabilistic data structures that the structure updater 116 generates and/or updates. The structure manager 118 can manage probabilistic data structures 124 as the structure updater 116 generates probabilistic data structures for different time periods.

For example, the structure manager 118 can be configured to generate multiple probabilistic data structures for the same DNS server 106 or group of DNS servers 106 over time. To do so, the structure updater 116 can generate a first probabilistic data structure using domain names that the structure updater 116 identifies from DNS replies during a first defined time period. The structure updater 116 can initialize the first probabilistic data structure as an empty probabilistic data structure and add domain names from DNS replies to the first probabilistic data structure during the first defined time period. The structure manager 118 can label the first probabilistic data structure as a "current" probabilistic data structure, indicating the first probabilistic data structure is currently being updated by the structure manager 118. The current label can be any value. Responsive to the structure manager 118 and/or the structure updater 116 determining the first defined time period has ended, the structure manager 118 can update or change the label of the first probabilistic data structure to a "previous" label, which indicates that the first probabilistic data structure is still active but is not being updated. The previous label can be any value different from the current label.

The structure updater 116 can generate and initialize a second probabilistic data structure as an empty probabilistic data structure in response to the determination that the first defined time period has ended. The structure updater 116 can add domain names from DNS replies to the second probabilistic data structure during a second defined time period (e.g., a second defined time period subsequent, or directly subsequent, to the first defined time period). The structure manager 118 can label the second probabilistic data structure as a current probabilistic data structure. Both the first and the second probabilistic data structures can be used to determine whether to allow DNS queries with different domain names through to the DNS server 106.

Responsive to the structure manager 118 and/or the structure updater 116 determining the second defined time period has ended, the structure manager 118 can update or change the label of the second probabilistic data structure to a previous label and delete or otherwise remove from memory the first probabilistic data structure. This may be useful, for example, because DNS zones may change over time, which may cause domain names that were previously valid to become invalid (e.g., domain names may be removed from a zone or an entire zone may be removed). The structure updater 116 can generate and initialize a third probabilistic data structure as an empty probabilistic data structure in response to the determination that the second defined time period has ended. The structure updater 116 can add domain names from DNS replies to the third probabilistic data structure during a third defined time period (e.g., a third defined time period subsequent, or directly subsequent, to the second defined time period). The structure manager 118 can label the third probabilistic data structure as a current probabilistic data structure. The second and third probabilistic data structures can subsequently be used to determine whether to allow DNS queries with different domain names through to the DNS server 106. The structure updater 116 and structure manager 118 can similarly generate, update, label, relabel, and delete probabilistic data structures for the DNS server 106 at set or non-set intervals any number of times. The structure updater 116 and structure manager 118 can generate and store or maintain any number of probabilistic data structures at once (e.g., the multiple previous probabilistic data structures 124 can be stored at one time). The structure manager 118 can delete any number of probabilistic data structures at the end of a defined time period.

In one example, assume a defined time period (e.g., an interval) may be 10 minutes, 600 seconds. Assume a domain name is learned at time t=0, and invalidated in the DNS server 106 at t=1. The probabilistic data structure containing the domain name will move from "current" to "previous" after t=600 s, and will be deleted at t=1200 s. Thus, any queries for the stale domain name that are intercepted after t=1201 s may correspond to a negative query result in the active current and previous probabilistic data structures.

By generating different probabilistic data structures in this way over time, the structure updater 116 and the structure manager 118 can account for stale domain names that are represented in the probabilistic data structures and overcome the technical difficulties of deleting entries for individual domain names from the probabilistic data structures. The structure updater 116 may not be able to age individual domain names, or stale domain names, out of the probabilistic data structures. By generating and replacing probabilistic data structures in this manner, the structure updater 116 and structure manager 118 can avoid storing stale data that would otherwise be used for DDOS attack management. The structure updater 116 and the structure manager 118 can similarly maintain multiple probabilistic data structures for any number of individual or groups of DNS servers 106.

The query manager 120 may comprise programmable instructions that, upon execution, cause the processor 110 to manage DNS queries that the monitoring device 102 receives when the packet collector 114 detects an attack (e.g., an attack on the network 105 or a DNS server 106). For example, the packet collector 114 can detect an attack on the network 105. The packet collector 114 or the monitoring device 102 can receive data packets of DNS queries from the client devices 104. The query manager 120 can parse the data packets of the DNS queries and identify domain names in the respective DNS queries. The query manager 120 can query the probabilistic data structure 124 using the identified domain names from the DNS queries, in some cases in response to detecting the attack. In doing so, the query manager 120 may determine whether the individual domain names are "definitely not" in the probabilistic data structure or are "likely in" in the probabilistic data structure. The query manager 120 can forward data packets of DNS queries that include domain names that are likely in the probabilistic data structure to the destination DNS servers. The query manager 120 can discard or delete the data packets of DNS queries that include domain names that are not in the probabilistic data structure, in some embodiments.

In embodiments in which the structure updater 116 and the structure manager 118, generate and maintain multiple probabilistic data structures for a DNS server 106 or group of DNS servers 106 for different defined time periods, the query manager 120 can query each of the multiple probabilistic data structures for domain names. For example, responsive to the packet collector 114 detecting an attack and collecting a data packet for a DNS query, the query manager 120 can identify a domain name from the data packet and query a current probabilistic data structure and a previous probabilistic data structure using the identified domain name. Responsive to the query manager 120 determining the domain name is in one or both of the current probabilistic data structure or the previous probabilistic data structure, the query manager 120 can determine the DNS query is valid and forward the DNS query to the DNS server 106 for which the DNS query was intended. However, responsive to determining the domain name is not in either the current probabilistic data structure or the previous probabilistic data structure, the query manager 120 may drop or otherwise not forward the DNS query to the DNS server 106.

In some embodiments, the query manager 120 can query a probabilistic data structure that corresponds to a DNS server 106 for which a DNS query was intended. For example, responsive to the packet collector 114 retrieving a data packet of a DNS query, the query manager 120 can identify an IP address of the DNS server 106. The IP address may be mapped or correspond to a probabilistic data structure 124. The query manager 120 can identify or select the probabilistic data structure of multiple probabilistic data structures 124 based on the IP address in the DNS query and the mapping of the IP address to the probabilistic data structure. The query manager 120 can query the identified probabilistic data structure using the domain name of the DNS query to determine whether the domain name in the DNS query is valid (e.g., is likely in the probabilistic data structure or is definitely not in the probabilistic data structure).

The network controller 122 may comprise programmable instructions that, upon execution, cause the processor 110 to restrict or otherwise control data packets transmitted between client devices 104 and the DNS servers 106. The network controller 122 can restrict transmission of a DNS query or communication by the computing device with a DNS server 106 responsive to the query manager 120 determining a domain name of the DNS query is not stored in or represented in a probabilistic data structure. The network controller 122 can do so using one or more methods. For example, the network controller 122 can restrict transmission of the DNS query by dropping the DNS query or otherwise not transmitting the DNS query to the DNS server 106 for which the DNS query was intended. In another example, the network controller 122 can identify the client device 104 that transmitted the DNS query and limit a rate of traffic transmitted to and/or received by the identified client device 104. In another example, the network controller 122 can perform a DNS authentication technique for the DNS query to determine whether the DNS query is authentic or valid or not. Responsive to determining the DNS query is authentic or valid based on the DNS authentication, the network controller 122 can forward the DNS query to the intended DNS server 106. Responsive to determining the DNS query is not authenticated or is invalid, the network controller 122 can otherwise restrict the DNS query or the client device 104 that transmitted the DNS query. In another example, the network controller 122 can perform regular expression filtering on the DNS query, such as by performing regular expression filtering on the payload of the DNS query. Responsive to determining not to filter the DNS query based on the regular expression filtering, the network controller 122 can forward the DNS query to the intended DNS server 106. Responsive to determining to filter the DNS query, the network controller 122 can otherwise restrict the DNS query or the computing device that transmitted the DNS query. In another example, the network controller 122 can specifically limit DNS queries (e.g., and not other network communication) by the computing device. In another example, the network controller 122 can apply a rate limit for any DNS queries that are directed to a specific DNS domain, such as on a per-domain basis. The network controller 122 can restrict the DNS query and/or the client device 104 that transmitted the DNS query in any manner.

In some embodiments, the structure updater 116 can delete entries from a probabilistic data structure generated from domain names as described herein. The structure updater 116 can delete an entry in the probabilistic data structure (e.g., a previous probabilistic data structure or a current probabilistic data structure) based on a negative DNS response. For example, the structure updater 116 may identify a negative DNS response (e.g., a DNS response that includes NXDOMAIN or "no such name") that includes a queried domain name. Responsive to determining the DNS response is negative based on the negative text in the DNS response, the structure updater 116 can query the probabilistic data structure with the domain name in the negative response. Responsive to determining the domain name in the negative DNS response is in the probabilistic data structure, the structure updater 116 can "delete" an entry corresponding to the domain name from the probabilistic data structure. Accordingly, the structure updater 116 can remove stale or incorrect data from the probabilistic data structure.

In some embodiments, the components 114-122 may perform the techniques described above with DNS queries and DNS responses in reverse. The components 114-122 may do so to protect recursive servers from a flood of malicious error responses. For example, the packet collector 114 can receive DNS queries. The packet collector 114 may receive the DNS queries from recursive DNS servers 106. The structure updater 116 can generate and/or update one or more probabilistic data structures with transaction identifier and source port (e.g., an identification or number of a source port) pairs that the structure updater 116 identifies from the DNS queries. In doing so, the structure updater 116 and the structure manager 118 can generate current and previous probabilistic data structures as well as remove stale probabilistic data structures as described above. The packet collector 114 can retrieve or collect DNS responses transmitted to the DNS server 106 (e.g., the DNS server 106 being attacked). Responsive to detecting an attack (e.g., based on a user input or responsive to receiving a message indicating an attack from another computing device), the query manager 120 can identify transaction identifiers and destination ports (e.g., destination portion identifications or numbers) from the DNS responses and use the identified transaction identifiers and destination ports to query the probabilistic data structure (e.g., the probabilistic data structure generated for the DNS server 106 being attacked). Based on the queries, the query manager 120 can determine transaction identifier and destination port pairs of the DNS responses are definitely not in the probabilistic data structure or are likely in the probabilistic data structure. The query manager 120 may do so because the numbers of the destination ports may correspond to the same values as the numbers of the source ports stored in the probabilistic data structure. Responsive to determining a transaction identifier and destination port pair of a DNS response is likely in the probabilistic data structure (e.g., likely matches a transaction identifier and source port pair in the probabilistic data structure), the query manager 120 can forward the DNS response to the DNS server 106 being attacked. Otherwise, the network controller 122 can restrict transmission of the DNS response (e.g., drop or remove from memory without forwarding) or restrict communication by or to the computing device (e.g., limit a rate of traffic transmitted to the computing device and/or transmitted by the computing device that transmitted the DNS response). In some embodiments, domain names can be used instead of transaction identifiers and source/destination ports to protect recursive servers from attacks.

In another example, the structure updater 116 can generate and/or maintain multiple probabilistic data structures at once to account for stale or "aged" data. For example, the packet collector 114 can retrieve DNS queries transmitted by the DNS server 106 during a first defined time period. The structure updater 116 can generate a current probabilistic data structure from transaction identifier and source port pairs of the query messages transmitted by the DNS server only during the first defined time period. The structure updater 116 can detect an end to the first defined time period. In response to doing so, the structure manager 118 can update a label of the current probabilistic data structure from a current label to a previous label. The packet collector 114 can then retrieve DNS queries transmitted by the DNS server 106 during a second defined time period subsequent (e.g., immediately subsequent) to the first defined time period. The structure updater 116 can generate and update a new probabilistic data structure with domain names of DNS queries transmitted during the second defined time period. The structure manager 118 can add a label to the new probabilistic data structure to indicate the new probabilistic data structure is a current probabilistic data structure. In cases in which there was a previous probabilistic data structure prior to the beginning of the second defined time period, the structure manager 118 can delete such a previous probabilistic data structure. The structure updater 116 and the structure manager 118 can repeat (e.g., periodically repeat) this process to maintain the integrity of the stored transaction identifier and source port pairs and remove stale transaction identifier and source port pairs from the probabilistic data structures. In some embodiments, the defined time periods may be shorter when protecting a recursive server from a flood of malicious error responses because the valid set of transaction identifier and source port pairs or domain names may change more rapidly than when protecting an authoritative server from a request flood.

The query manager 120 can query both probabilistic data structures (e.g., the current probabilistic data structure and the (non-deleted) previous probabilistic data structure). For example, the packet collector 114 can detect an attack on the network 105. Subsequent to doing so, the packet collector 114 can collect DNS responses intended for the DNS server 106. The query manager 120 can identify transaction identifier and destination port pairs from the DNS responses and query both the current probabilistic data structure and the previous probabilistic data structure with the transaction identifier and destination port pairs. Responsive to determining a transaction identifier and destination port pair for a DNS response is likely in either of the probabilistic data structures, the query manager 120 can forward the DNS response to the DNS server 106. Otherwise, the network controller 122 can restrict the DNS response or communication by the computing device that initially transmitted the DNS response, as described herein.

In some embodiments, the monitoring device 102 performs the systems and methods described herein without using probabilistic data structures. Instead, the monitoring device 102 can use a static name configuration. For example, in the static name configuration, the monitoring device 102 may not monitor DNS queries to populate any probabilistic data structures. Instead, the monitoring device 102 may receive a user-provided set of domain names as input. The monitoring device 102 may then monitor DNS queries or DNS replies and compare domain names in the DNS queries or DNS replies with the set of domain names. The monitoring device 102 may forward DNS queries or DNS replies to the destination computing devices of the DNS queries or DNS replies (e.g., a DNS server 106 or a client device 104) responsive to determining domain names in the DNS queries or the DNS replies have a match in the set of domain names. The monitoring device 102 may restrict DNS queries or DNS replies that do not have a match or restrict communication by or communication to the computing devices that transmit DNS queries or DNS replies that contain non-matching domain names. In the static name configuration, the monitoring device 102 may not perform an aging process for the domain names in the set. Instead, the monitoring device 102, may receive an update to the set of domain names or a new set of domain names (e.g., as user input). Responsive to receiving the update or the new set of domain names, the monitoring device 102 may discard the original set of domain names, replacing the discarded set of domain names with the updated or the new set of domain names.

Figure 2:
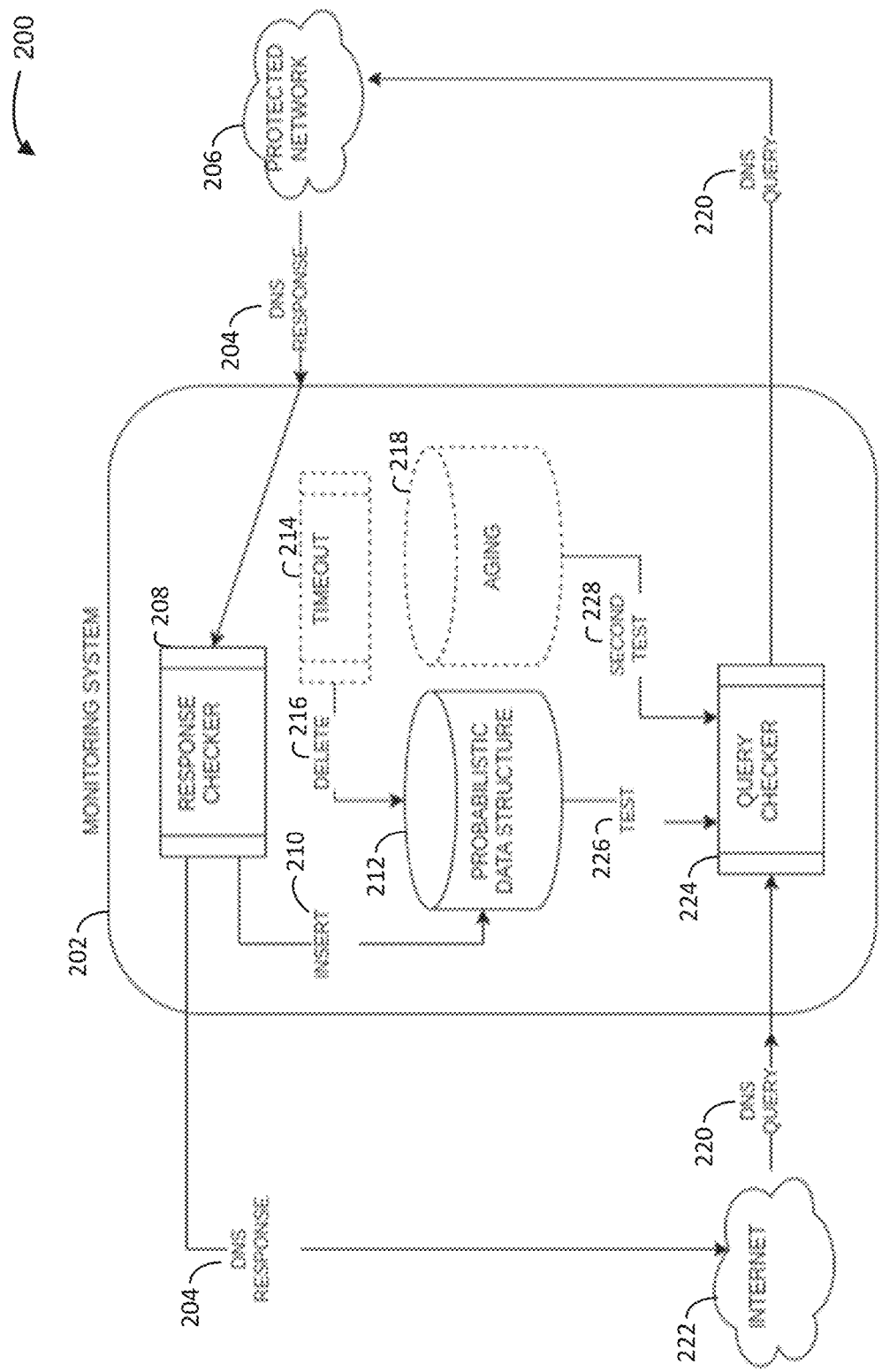
FIG. 2 illustrates a scenario of operating a DNS server protection system, in accordance with an implementation.

FIG. 2 illustrates a scenario 200 of operating a DNS server protection system, in accordance with an implementation. Operations and actions performed in the scenario can be performed by components of the system 100 or components that are similar to the components of the system 100, in some cases. The scenario 200 may include more or fewer operations or actions and the operations or actions may be performed in any order. The scenario 200 may involve more or fewer components.

In the scenario 200, a monitoring system 202 (e.g., the monitoring device 102, shown and described with reference to FIG. 1) can monitor DNS responses and DNS queries transmitted between client devices and DNS servers. In doing so, the monitoring system 202 may first collect DNS responses 204 transmitted by DNS servers across a network 206 (e.g., a protected network). The monitoring system 202 may collect the DNS responses 204 during a "peace time" in which no attack on the network 206 or a DNS server communicating over the network 206 has been detected. The monitoring system 202 can execute a response checker 208 to parse affirmative (non-error) DNS responses 204 for domain names. The response checker 208 can insert 210 the domain names (or representations or indications of the domain names) in a probabilistic data structure 212. The monitoring system 202 can forward the DNS responses 204 to client devices that transmitted DNS queries based on which the DNS responses 204 were transmitted.

As the response checker 208 adds domain names to the probabilistic data structure 212, the monitoring system 202 can remove stale data from the probabilistic data structure 212. For example, in some embodiments, the monitoring system 202 can execute a timeout function 214 in which the timeout function 214 deletes 216 individual entries from the probabilistic data structure 212 after the respective entries have been stored in the probabilistic data structure for a defined amount of time. The timeout function 214 may perform such deletion techniques when the probabilistic data structure 212 is a cuckoo filter, for example.

In another example, in some embodiments, the monitoring system 202 can store an aging probabilistic data structure 218 in addition to the probabilistic data structure 212. The aging probabilistic data structure 218 may be a previous probabilistic data structure and the probabilistic data structure 212 may be a current probabilistic data structure. The response checker 208 can store domain names in the probabilistic data structure 212 for a first defined time period. At the end of the first defined time period, the probabilistic data structure 212 may become the aging probabilistic data structure 218. For a second defined time period subsequent to the first defined time period, the response checker 208 can store domain names in a new probabilistic data structure 212 that replaces the now aging probabilistic data structure 218. At the end of the second defined time period, the monitoring system 202 can delete the aging probabilistic data structure 218, change the current probabilistic data structure 212 to be the aging probabilistic data structure 218, and insert domain names in the new probabilistic data structure 212. In this way, the monitoring system 202 may delete stale domain names in probabilistic data structures without deleting individual entries, which may not be possible in the probabilistic data structures.

Subsequent to detecting an attack (e.g., an attack on the protected network 206 or a DNS server), the monitoring system 202 can monitor DNS queries 220 that are transmitted across a network 222 (e.g., the Internet). The DNS queries 220 may be transmitted by client devices and be intended for DNS servers. Responsive to detecting the attack, the monitoring system 202 can execute a query checker 224 to determine whether domain names in the DNS queries 220 are stored in the probabilistic data structure 212 or the aging probabilistic data structure 218. For example, the query checker 224 can parse a domain name from a DNS query 220. In a first test 226, the query checker 224 can determine whether the domain name is likely represented in or stored in the probabilistic data structure 212. Responsive to determining the domain name is not stored in or represented in the probabilistic data structure 212, the query checker 224 can perform a second test 228 and determine whether the domain name is likely represented in or stored in the aging probabilistic data structure 218. In embodiments in which the monitoring system 202 only stores the probabilistic data structure 212 and not the aging probabilistic data structure 218, the query checker 224 may only perform the first test 226. Responsive to determining the domain name is likely in at least one of the probabilistic data structure 212 or the aging probabilistic data structure 218, the query checker 224 can forward the DNS query 220 across the network 206 to the intended DNS server. Otherwise, the monitoring system 202 may drop or otherwise restrict the DNS query 220 from being transmitted to the DNS server and/or restrict communication to or by the client device that transmitted the DNS query 220.

Figure 3:
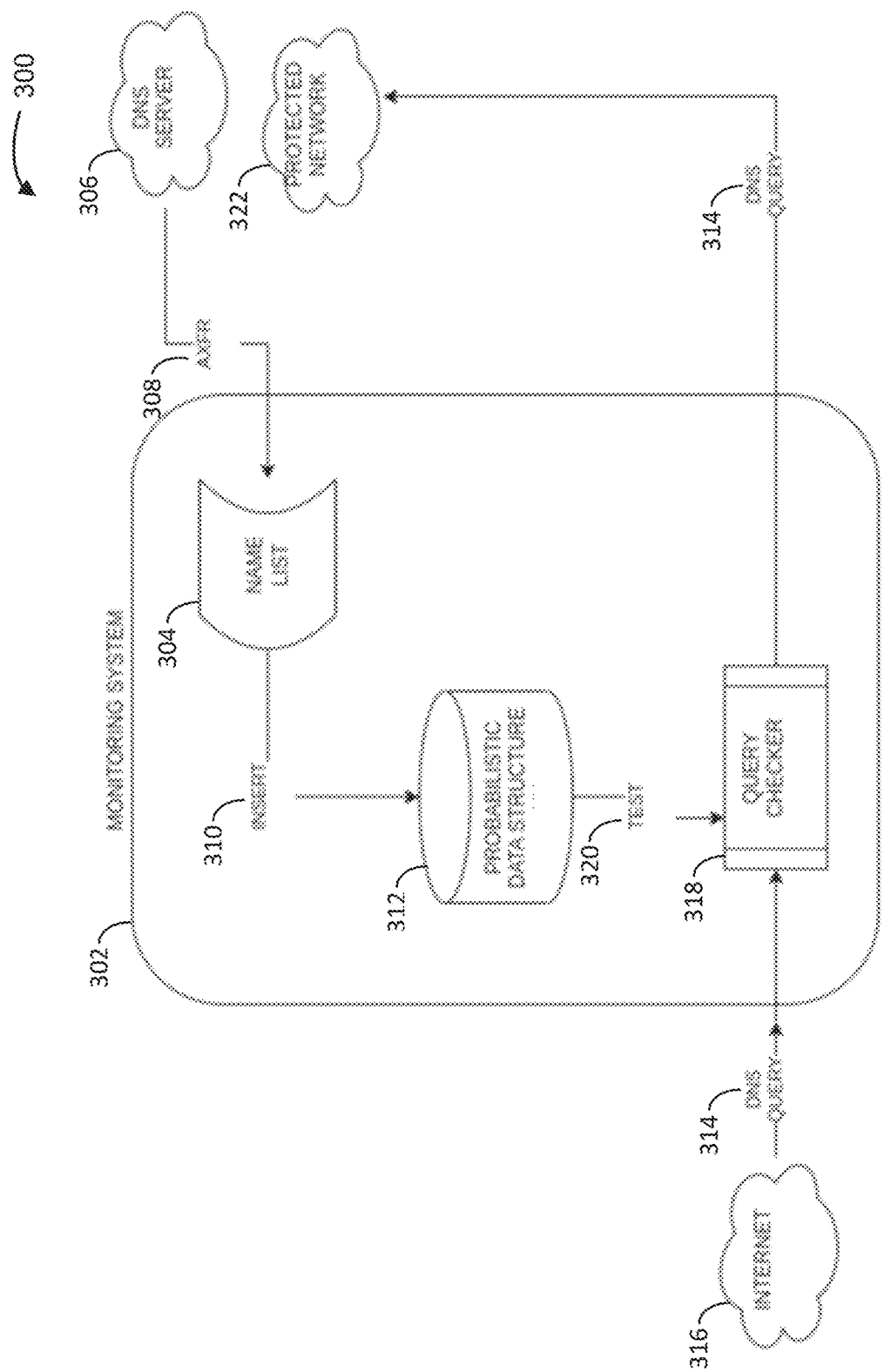
FIG. 3 illustrates a scenario of operating a DNS server protection system, in accordance with an implementation.

FIG. 3 illustrates a scenario 300 of operating a DNS server protection system, in accordance with an implementation. Operations and actions performed in the scenario can be performed by components of the system 100 or components that are similar to the components of the system 100, in some cases. The scenario 300 may include more or fewer operations or actions and the operations or actions may be performed in any order. The scenario 300 may involve more or fewer components.

In the scenario 300, a monitoring system 302 (e.g., the monitoring device 102, shown and described with reference to FIG. 1) can receive a set of domain names. The monitoring system 302 can receive the set of domain names 304 from a DNS server 306. The monitoring system 302 can receive the set of domain names 304 in an authoritative zone transfer 308 (AXFR), in some cases. The monitoring system 302 can insert the set of domain names 304 into a probabilistic data structure 312.

Subsequent to detecting an attack (e.g., an attack on a network 322 (e.g., protected network) or a DNS server), the monitoring system 302 can monitor DNS queries 314 that are transmitted across a network 316 (e.g., the Internet). The DNS queries 314 may be transmitted by client devices and be intended for one or more DNS servers (e.g., the DNS server 306). Responsive to detecting the attack, the monitoring system 302 can execute a query checker 318 to determine whether domain names in the DNS queries 314 are stored in the probabilistic data structure 312. For example, the query checker 318 can parse a domain name from a DNS query 314. In a test 320, the query checker 318 can determine whether the domain name is represented in or stored in the probabilistic data structure 312. Responsive to determining the domain name is likely in or represented in the probabilistic data structure 312, the query checker 318 can forward the DNS query 314 across the network 322 to the intended DNS server. Otherwise, the monitoring system 302 may drop or otherwise restrict the DNS query 314 from being transmitted to the DNS server and/or restrict communication to or by the client device that transmitted the DNS query 314.

Figure 4:
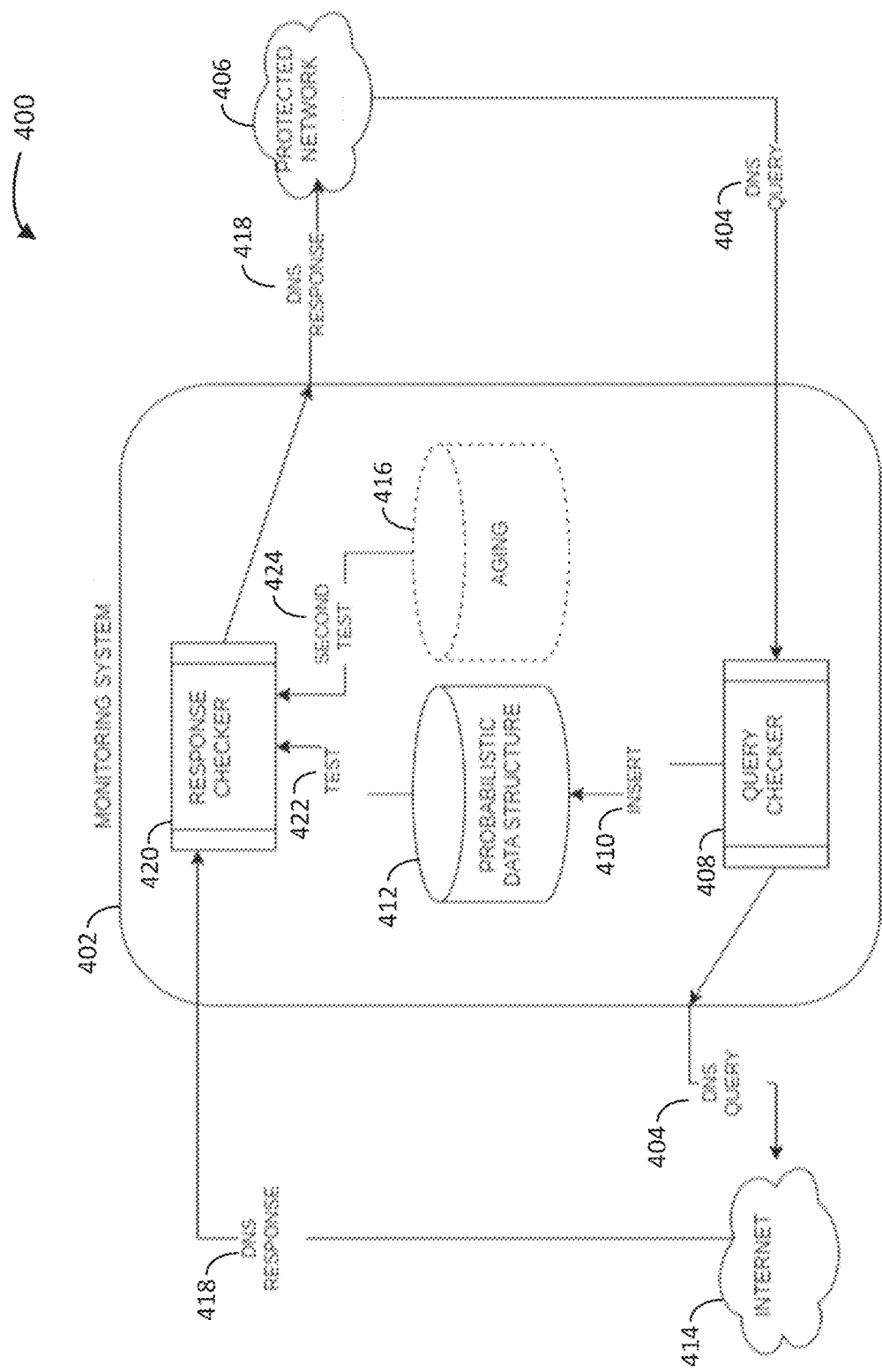
FIG. 4 illustrates a scenario of operating a DNS server protection system, in accordance with an implementation.

FIG. 4 illustrates a scenario 400 of operating a DNS server protection system, in accordance with an implementation. Operations and actions performed in the scenario can be performed by components of the system 100 or components that are similar to the components of the system 100, in some cases. The scenario 400 may be a reverse version of the scenario 200. The scenario 400 may include more or fewer operations or actions and the operations or actions may be performed in any order. The scenario 400 may involve more or fewer components.

In the scenario 400, a monitoring system 402 (e.g., the monitoring device 102, shown and described with reference to FIG. 1) can monitor DNS responses and DNS queries transmitted between computing devices and DNS servers. In doing so, the monitoring system 402 may first collect DNS queries 404 transmitted by computing devices (e.g., recursive DNS servers) across a network 406 (e.g., a protected network). The monitoring system 402 can execute a query checker 408 to parse the DNS queries 404 for transaction identifiers and source port numbers. The query checker 408 can insert 410 the transaction identifier and source port numbers, as pairwise combinations, in a probabilistic data structure 412. The monitoring system 402 can forward the DNS queries 404 to DNS servers across a network 414 (e.g., the Internet).

As the query checker 408 adds transaction identifiers and source port numbers to the probabilistic data structure 412, the monitoring system 402 can remove stale data from the probabilistic data structure 412. The monitoring system 402 can do so by iteratively generating and deleting probabilistic data structures over time. For example, in some embodiments, the monitoring system 402 can store an aging probabilistic data structure 416 in addition to the probabilistic data structure 412. The aging probabilistic data structure 416 may be a previous probabilistic data structure and the probabilistic data structure 412 may be a current probabilistic data structure. The query checker 408 can store transaction identifiers and source port numbers in the probabilistic data structure 412 for a first defined time period. At the end of the first defined time period, the probabilistic data structure 412 may become the aging probabilistic data structure 416. For a second defined time period subsequent to the first defined time period, the query checker 408 can store transaction identifiers and source port numbers in a new probabilistic data structure 412 that replaces the now aging probabilistic data structure 416. At the end of the second defined time period, the monitoring system 402 can delete the aging probabilistic data structure 416, change the current probabilistic data structure 412 to be the aging probabilistic data structure 416, and insert transaction identifiers and source port numbers in the new probabilistic data structure 412. In this way, the monitoring system 402 may delete stale entries in probabilistic data structures without deleting individual entries, which may not be possible in the probabilistic data structures.

In response to detecting an attack (e.g., an attack on the protected network 406 or a DNS server), the monitoring system 402 can begin monitoring DNS responses 418 that are transmitted across the network 414. The DNS responses 418 may be transmitted by DNS servers and may be intended for DNS servers. The monitoring system 402 can execute a response checker 420 to determine whether transaction identifiers and destination port numbers, pairwise, in the DNS responses 418 are stored in the probabilistic data structure 412 or the aging probabilistic data structure 416. It should be noted that the destination port number of the DNS response corresponds to the source port number from the original DNS query that was stored in the probabilistic data structure 412 and/or 416. For example, the response checker 420 can parse a transaction identifier and destination port number from a DNS response 418. In a first test 422, the response checker 420 can determine whether the transaction identifier and destination port number is likely represented in or stored in the probabilistic data structure 412. Responsive to determining the transaction identifier and destination port number is not stored in or represented in the probabilistic data structure 412, the response checker 420 can perform a second test 424 and determine whether the transaction identifier and destination port number is likely represented in or stored in the aging probabilistic data structure 416. In embodiments in which the monitoring system 402 only stores the probabilistic data structure 412 and not the aging probabilistic data structure 416, the response checker 420 may only perform the first test 422. Responsive to determining the transaction identifier and destination port number is likely in at least one of the probabilistic data structure 412 or the aging probabilistic data structure 416, the response checker 420 can forward the DNS response 418 across the network 406 to the intended DNS server. Otherwise, the monitoring system 402 may drop or otherwise restrict the DNS response 418 from being transmitted to the DNS server and/or restrict communication to or by the DNS server that transmitted the DNS response 418.

Figure 5:
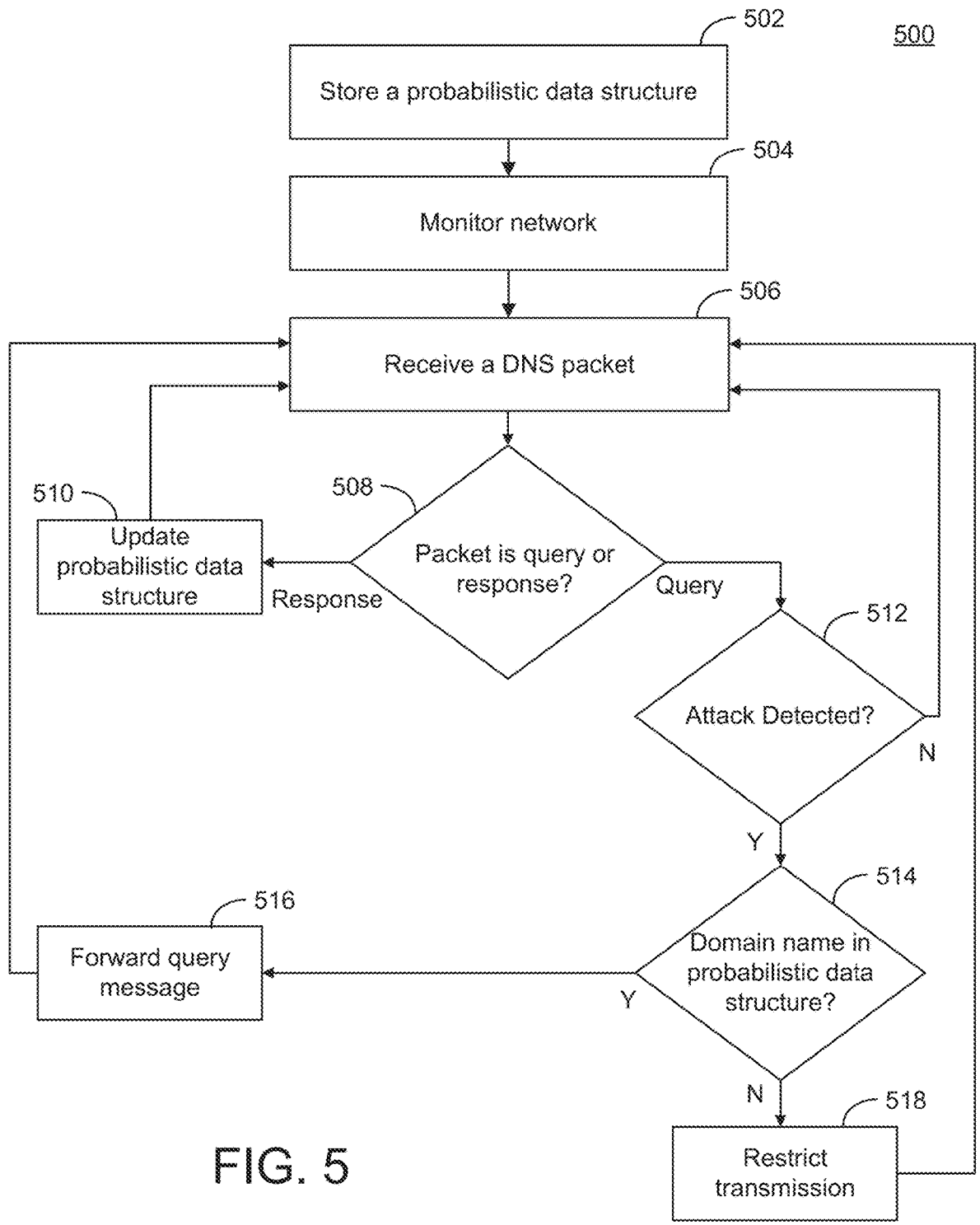
FIG. 5 is an illustration of a method for protecting a DNS server, in accordance with an implementation.

FIG. 5 is an illustration of a method 500 for protecting a DNS server, in accordance with an implementation. The method 500 can be performed by a data processing system (e.g., a client device, the monitoring device 102, shown and described with reference to FIG. 1, a server system, etc.). The method 500 may include more or fewer operations and the operations may be performed in any order. Performance of the method 500 may enable the data processing system to protect a DNS server against DDOS attacks in real time while minimizing the data storage and processing requirements to do so.

At operation 502, the data processing system stores a probabilistic data structure. The probabilistic data structure can be a cuckoo filter, a bloom filter, or any other type of probabilistic data structure. The data processing system can store the probabilistic data structure in memory. The data processing system can store domain names in the probabilistic data structure, such as by storing representations or indications of the domain names in the probabilistic data structure.

At operation 504, the data processing system monitors a network. The data processing system collects, receives, or retrieves DNS data packets from a DNS server (or multiple DNS servers) or from a DNS client (or multiple DNS clients). The DNS data packets may be responses to DNS queries that client devices transmit to the DNS server over the network. The DNS data packets may be queries from DNS clients that client devices transmit to the DNS server over the network. The data processing system can operate as an intermediary server between the DNS server and the client devices. The data processing system can receive the DNS queries from the DNS clients that are transmitted to the DNS server. The data processing system can receive the DNS responses from the DNS server and forward the DNS responses to the client devices that transmitted DNS queries based on which the DNS server transmitted the DNS responses.

At operation 506, the data processing system receives a DNS data packet. The data processing system can receive the DNS data packet from the DNS server, or a DNS query data packet from a DNS client. The data processing system can receive the response data packet while monitoring the network in operation 504. At operation 508, the data processing system checks if the DNS data packet is a query or a response. If the DNS data packet is a response, processing continues at operation 510. If the DNS data packet is a query, processing continues at operation 512.

At operation 510, the data processing system updates the probabilistic data structure. The data processing system can update the probabilistic data structure with data of the response data packet. For example, the data processing system can parse the response data packet. In doing so, the data processing system can identify or extract a domain name from the response data packet. The data processing system can update the probabilistic data structure to include the identified or extracted domain name, such as by storing an indication or representation (e.g., a hash or portion of a hash) of the domain name in the probabilistic data structure. In cases in which the domain name is already stored in the probabilistic data structure, the data processing system may not further update the probabilistic data structure, in some instances. In some embodiments, the data processing system may only update the probabilistic data structure with a domain name from a response data packet responsive to identifying an affirmative response code in the response data packet. The data processing system may repeat operations 506-510 any number of times while monitoring the network. The response data packet may contain multiple domain names, in which case operation 508 may be repeated for each domain name contained in the response data packet. For example, the response data packet may contain a CNAME, or it may be a response to an "ANY" query which contains all the records for a domain name. Processing continues at operation 506.

At operation 512, the data processing system checks whether an attack on the network has been detected. The data processing system may detect an attack on the network responsive to receiving a user input indicating the network is being attacked or responsive to receiving a message from another computing device indicating the network is being attacked. The attack may be a DDOS attack. The attack may be an attack on the network and/or a DNS server connected with the network. The data processing system may detect the attack in any manner. If an attack has been detected, processing continues at operation 514. If no attack has been detected, the DNS query packet is forwarded, and processing continues at operation 506.

At operation 514, the data processing system extracts a domain name from the DNS query packet. The system queries the probabilistic data structure to determine if the domain name is present. If the domain name is not present, processing continues at operation 518. If the domain name is determined to be likely present, processing continues at operation 516.

At operation 516, the data processing system forwards the query message to its intended destination. Processing continues at operation 506. However, responsive to determining the domain is not stored in the probabilistic data structure, at operation 518, the data processing system restricts transmission. The data processing system can restrict transmission of the query message and/or communication by and/or to the client device that transmitted the query message. For example, the data processing system can restrict transmission of the query message by dropping the query message (e.g., not forwarding the query message and/or removing the query message from memory). In another example, the data processing system can perform DNS authentication or regular expression filtering. In another example, the data processing system can limit a rate of traffic transmitted to the client device and/or received from the client device. In this way, the data processing system can protect DNS servers from using excess process resources in DDOS attacks.

Figure 6:
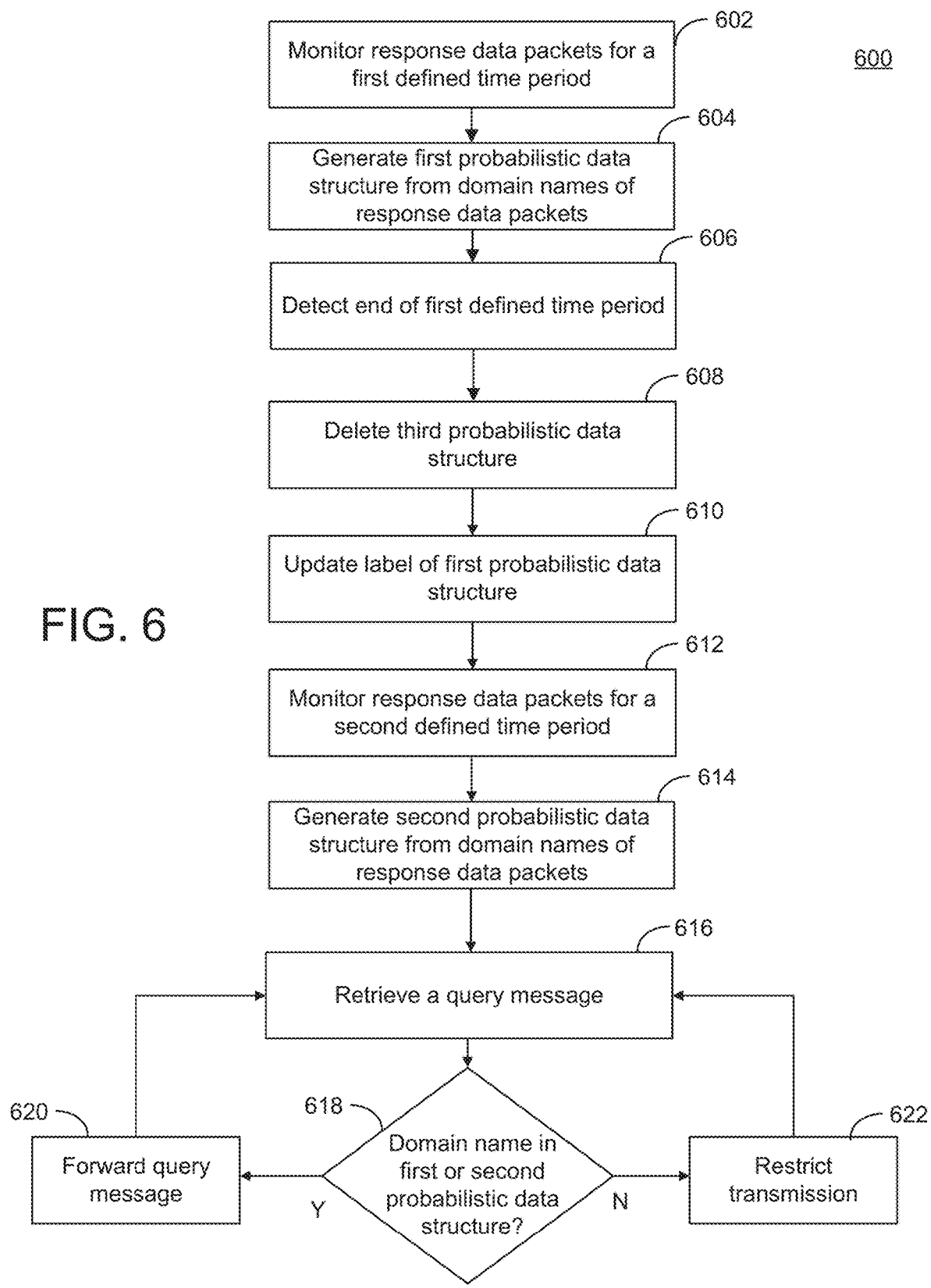
FIG. 6 is an illustration of a method for protecting a DNS server, in accordance with an implementation.

FIG. 6 is an illustration of a method 600 for protecting a DNS server, in accordance with an implementation. The method 600 can be performed by a data processing system (e.g., a client device, the monitoring device 102, shown and described with reference to FIG. 1, a server system, etc.). The method 600 may include more or fewer operations and the operations may be performed in any order. Performance of the method 600 may enable the data processing system to protect a DNS server against DDOS attacks in real time while avoiding using stale (and thus potentially inaccurate) data to do so.

At operation 602, the data processing system monitors response data packets. The response data packets can be DNS replies to DNS queries from one or more DNS servers. The data processing system can monitor the response data packets for a first defined time period. The DNS responses may be responses to DNS queries that client devices transmit to the DNS server over the network. The data processing system can operate as an intermediary server between the DNS server and the client devices. The data processing system can receive the DNS responses from the DNS server and forward the DNS responses to the client devices that transmitted DNS queries based on which the DNS server transmitted the DNS responses.

At operation 604, the data processing system generates a first probabilistic data structure. The first probabilistic data structure can be a cuckoo filter or a bloom filter. The data processing system can generate the first probabilistic data structure with representations or indications of domain names from the monitored response data packets. For example, the data processing system can identify or extract domain names from the response data packets collected at operation 602 during the first defined time period. The data processing system can identify the domain names in the response data packets. The data processing system can generate and/or representations (e.g., hash values or partial hash values) of the domain names. The data processing system can store the representations in the first probabilistic data structure.

At operation 606, the data processing system detects an end of the first defined time period. To do so, in one example, the data processing system may maintain an internal clock. The data processing system can increment the clock at set time intervals (e.g., every second). The data processing system can compare the increment time of the clock with the defined time period. The data processing system can detect the end of the first defined time period responsive to determining the incremented time of the clock has reached the end of the first defined time period. In another example, the data processing system can use a calendar and determine the end of the first defined time period responsive to determining the current day is the end of the first defined time period. The data processing system can detect the end of the first defined time period using any method.

At operation 608, the data processing system deletes a third probabilistic data structure. The data processing system can delete the third probabilistic data structure responsive to detecting the end of the first defined time period. The third probabilistic data structure may be a probabilistic data structure that the data processing system previously determined to have "aged." For example, the data processing system can store two probabilistic data structures at a time, a current probabilistic data structure and a previous probabilistic data structure. The current probabilistic data structure can be a probabilistic data structure that the data processing system is currently updating with domain names identified from response data packets of DNS replies. The previous probabilistic data structure can be a probabilistic data structure that the data processing system had previously generated and updated with domain names of response data packets of DNS replies for a prior time period. The data processing system can cycle through probabilistic data structures for different defined time periods such that the data processing system only maintains two probabilistic data structures at one time, updating only one of the probabilistic data structures with domain names. Responsive to detecting the end of the first defined time period at operation 606, the data processing system may delete the previous probabilistic data structure, or the third probabilistic data structure, change the current probabilistic data structure (e.g., the first probabilistic data structure) to a previous probabilistic data structure, and begin generating and updating a new current probabilistic data structure.

At operation 610, the data processing system updates a label of the first probabilistic data structure. For example, the data processing system may have initially labeled the first probabilistic data structure with a current label. The current label may indicate that the data processing system is updating the first probabilistic data structure with domain names. Responsive to detecting the end of the first defined time period, the data processing system may change the current label to a previous label. The previous label may indicate that the first probabilistic data structure is a previous probabilistic data structure that the data processing system is not updating with new domain names.

At operation 612, the data processing system monitors response data packets during a second defined time period. The second defined time period may be subsequent (e.g., immediately subsequent) to the first defined time period. The data processing system may monitor response data packets for the second defined time period in the same manner as the first defined time period.

At operation 614, the data processing system generates a second probabilistic data structure. The data processing system can label the second probabilistic data structure with a current label. The data processing system may generate the second probabilistic data structure with domain names of response data packets collected during the second defined time period. The data processing system can generate and update the second probabilistic data structure in the same manner as the first probabilistic data structure.

At operation 616, the data processing system retrieves a query message. The query message may be a DNS query from a client device to the DNS server. The data processing system may perform further processing on the query message responsive to detecting an attack on the network.

For example, at operation 618, the data processing system determines whether a domain name of the query message is in the first probabilistic data structure or the second probabilistic data structure. The data processing system can query the first probabilistic data structure and/or the second probabilistic data structure using the domain name of the query message. The data processing system may query the first probabilistic data structure responsive to determining the domain name is not stored in the second probabilistic data structure, in some embodiments. Responsive to determining the domain name is in at least one of the first probabilistic data structure or the second probabilistic data structure, the data processing system, at operation 620, the data processing system forwards the query message. Otherwise, responsive to determining the domain name is not in (e.g., not represented or stored in) either of the first probabilistic data structure or the second probabilistic data structure, at operation 622, the data processing system restricts transmission of the query message and/or communication by or to the client device that transmitted the query message.

Figure 7:
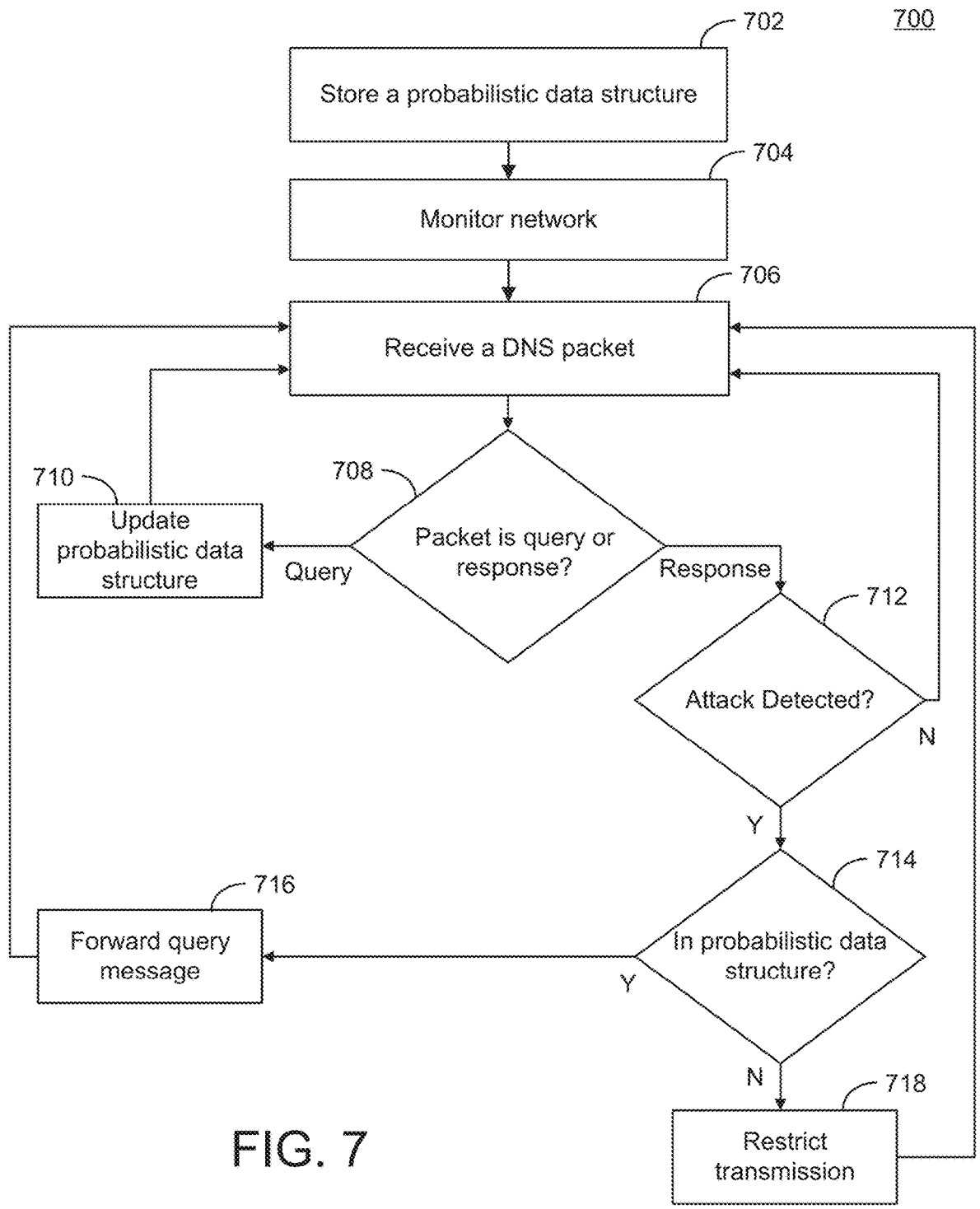
FIG. 7 is an illustration of a method for protecting a DNS server, in accordance with an implementation.

FIG. 7 is an illustration of a method 700 for protecting a DNS server, in accordance with an implementation. The method 700 can be performed by a data processing system (e.g., a client device, the monitoring device 102, shown and described with reference to FIG. 1, a server system, etc.). The method 700 may include more or fewer operations and the operations may be performed in any order. Performance of the method 700 may enable the data processing system to protect a recursive DNS server against DDOS attacks that include a flood of malicious error responses while minimizing the data storage and processing requirements to do so.

At operation 702, the data processing system stores a probabilistic data structure. The probabilistic data structure can be a cuckoo filter, a bloom filter, or any other type of probabilistic data structure. The data processing system can store the probabilistic data structure in memory. In some embodiments, the data processing system can store transaction identifiers and source ports (e.g., as a pairwise combination) in the probabilistic data structure, such as by storing representations of indications of the transaction identifiers and source ports in the probabilistic data structure. In some embodiments, the data processing system can store transaction identifiers, source ports, and destination Internet Protocol addresses (e.g., as a triplet) in the probabilistic data structure. In some embodiments, the data processing system can store domain names in the probabilistic data structure.

At operation 704, the data processing system monitors a network. The data processing system collects, receives, or retrieves DNS queries from the DNS server. The DNS queries may be queries that the DNS server transmits over the network. The data processing system can operate as an intermediary server between the DNS server and the computing devices transmitting the DNS queries. The data processing system can receive the DNS queries and forward the DNS queries to the DNS server.

At operation 706, the data processing system receives a DNS data packet. The data processing system can receive the DNS data packet from the DNS server. The data processing system can receive the DNS data packet while monitoring the network in operation 704.

At operation 708, the data processing system checks if the DNS data packet is a query or a response. If the DNS data packet is a query, processing continues at operation 710. If the DNS data packet is a response, processing continues at operation 712.

At operation 710, the data processing system updates the probabilistic data structure. The data processing system can update the probabilistic data structure with data of the query message. For example, the data processing system can parse the query message. In doing so, the data processing system can identify or extract a transaction identifier and a source port (e.g., identification or number of the source port) from the query message. The data processing system can update the probabilistic data structure to include the identified or extracted transaction identifier and the source port, such as by storing an indication or representation (e.g., a hash or portion of a hash) of the transaction identifier and source port in the probabilistic data structure. In cases in which the transaction identifier and source port are already stored as a pair in the probabilistic data structure, the data processing system may not further update the probabilistic data structure, in some instances. The data processing system may repeat operations 706-710 any number of times while monitoring the network.

At operation 712, the data processing system checks whether an attack on the network has been detected. The data processing system may detect an attack on the network responsive to receiving a user input indicating the network is being attacked or responsive to receiving a message from another computing device indicating the network is being attacked. The attack may be a DDOS attack. The attack may be an attack on the network and/or a DNS server connected with the network. The data processing system may detect the attack in any manner. If an attack has been detected, processing continues at operation 714. If no attack has been detected, the DNS response packet is forwarded (e.g., forward to the DNS server), and processing continues at operation 716.

At operation 714, the data processing system extracts a destination port and transaction identifier from the DNS response packet. The system queries the probabilistic data structure to determine if the transaction identifier and destination port from the DNS response packet is present. If the transaction identifier and destination port are not present (e.g., are not present as a pair), processing continues at operation 718. If the transaction identifier and destination port are determined to be likely present, processing continues at operation 716.

At operation 716, the data processing system forwards the DNS response to the DNS server. Processing continues at operation 706. However, responsive to determining the domain is not stored in the probabilistic data structure, at operation 718, the data processing system restricts transmission. The data processing system can restrict transmission of the response data packet and/or communication by and/or to the client device that transmitted the response data packet. For example, the data processing system can restrict transmission of the response data packet by dropping the response data packet (e.g., not forwarding the query message and/or removing the query message from memory). In another example, the data processing system can perform regular expression filtering. In another example, the data processing system can limit a rate of traffic transmitted to the computing device and/or received from the computing device. In this way, the data processing system can protect DNS servers from processing DDOS attacks that involve a flood of malicious error responses.

In some embodiments, the data processing system can perform the method 700 with domain names of DNS data packets instead of transaction identifiers and source/destination ports. In some embodiments, the data processing system can perform the method 700 with transaction identifiers, source ports/destination ports, and destination/source Internet Protocol addresses.

Figure 8A:
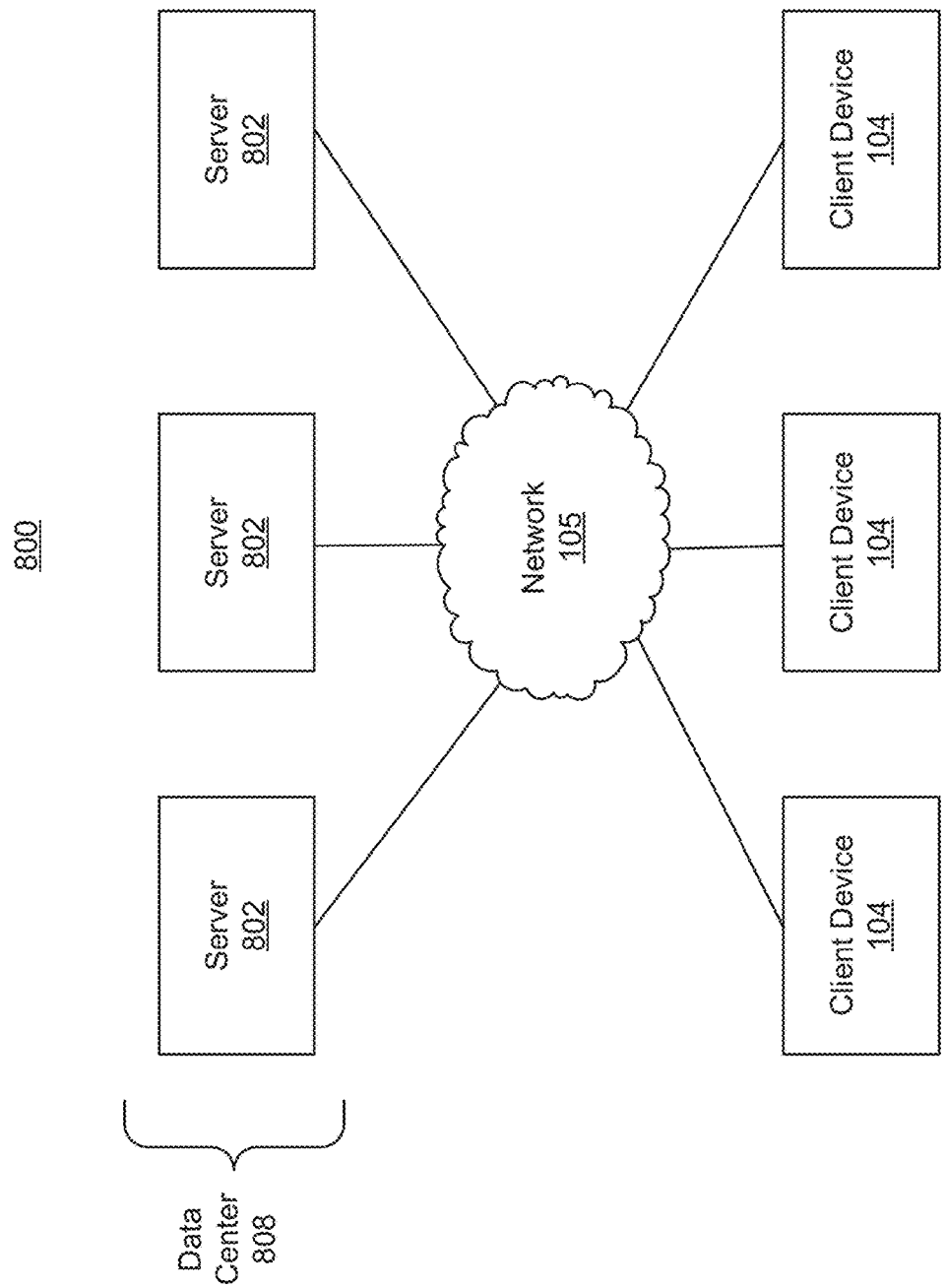
FIG. 8A is a block diagram depicting an implementation of a network environment including a client device in communication with a server device.

FIG. 8A depicts an example network environment that can be used in connection with the methods and systems described herein. In brief overview, the network environment 800 includes one or more client devices 104 (also generally referred to as clients, client node, client machines, client computers, client computing devices, endpoints, or endpoint nodes) in communication with one or more servers 802 (also generally referred to as servers, nodes, or remote machine) via one or more networks 105. In some embodiments, a client device 104 has the capacity to function as both a client node seeking access to resources provided by a server and as a server providing access to hosted resources for other client devices 104.

Although FIG. 8A shows a network 105 between the client devices 104 and the servers 802, the client devices 104 and the servers 802 can be on the same network 105. In embodiments, there are multiple networks 105 between the client devices 104 and the servers 802. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 800 can include multiple, logically grouped servers 802. The logical group of servers can be referred to as a data center 808 (or server farm or machine farm). In embodiments, the servers 802 can be geographically dispersed. The data center 808 can be administered as a single entity or different entities. The data center 808 can include multiple data centers 808 that can be geographically dispersed. The servers 802 within each data center 808 can be homogeneous or heterogeneous (e.g., one or more of the servers 802 or machines 802 can operate according to one type of operating system platform (e.g., WINDOWS NT, manufactured by Microsoft Corp. of Redmond, Washington), while one or more of the other servers 802 can operate on according to another type of operating system platform (e.g., Unix, Linux, or Mac OS X)). The servers 802 of each data center 808 do not need to be physically proximate to another server 802 in the same machine farm 808. Thus, the group of servers 802 logically grouped as a data center 808 can be interconnected using a network. Management of the data center 808 can be de-centralized. For example, one or more servers 802 can comprise components, subsystems and modules to support one or more management services for the data center 808.

Server 802 can be a file server, application server, web server, proxy server, appliance, network appliance, gateway, gateway server, virtualization server, deployment server, SSL VPN server, or firewall. In embodiments, the server 802 can be referred to as a remote machine or a node. Multiple nodes can be in the path between any two communicating servers.

Figure 8B:
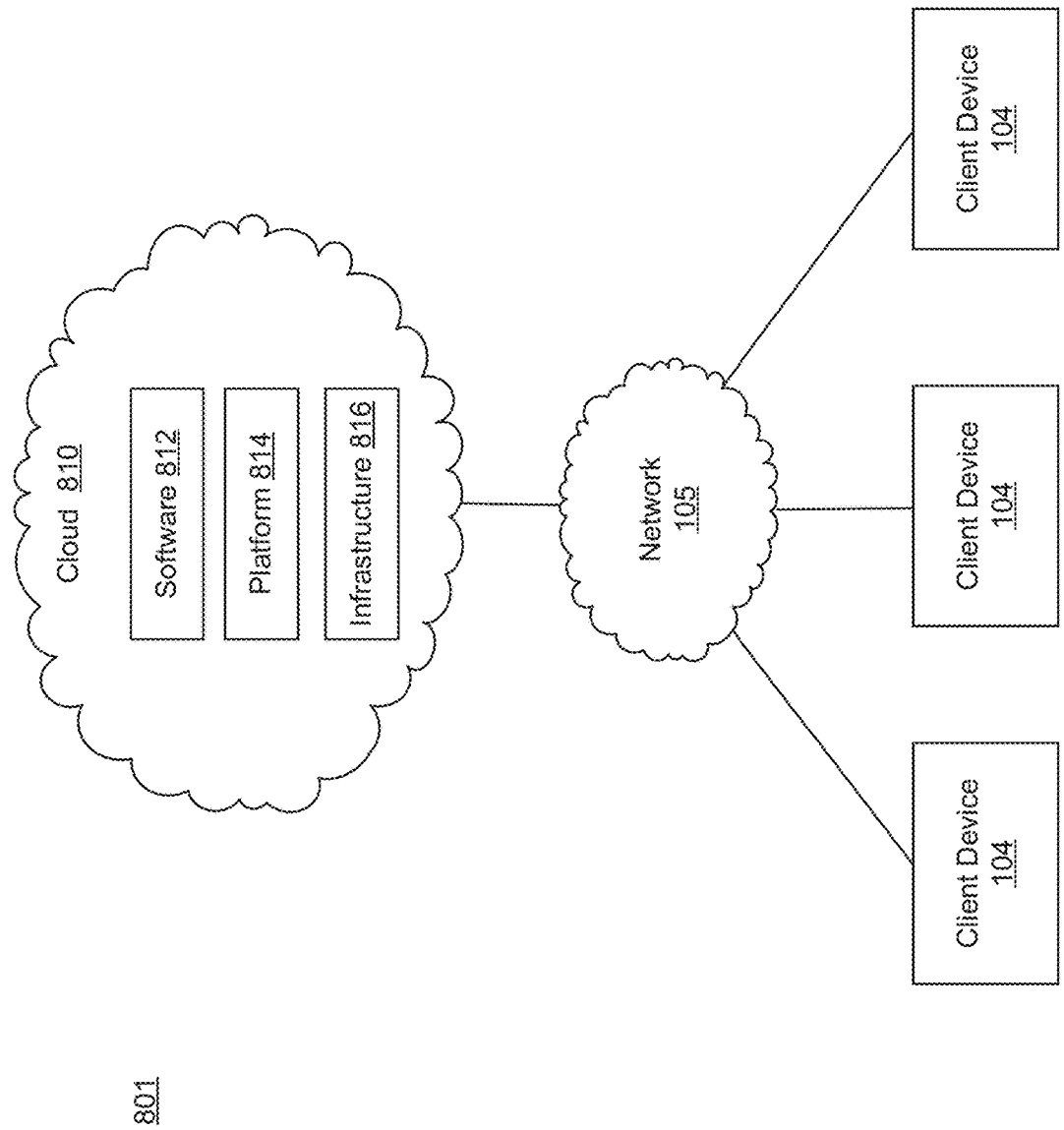
FIG. 8B is a block diagram depicting a cloud computing environment including a client device in communication with cloud service providers.

FIG. 8B illustrates an example cloud computing environment. A cloud computing environment 801 can provide the client device 104 with one or more resources provided by a network environment. The cloud computing environment 801 can include one or more client devices 104, in communication with the cloud 810 over one or more networks 105. Client devices 104 can include, e.g., thick clients, thin clients, and zero clients. A thick client can provide at least some functionality even when disconnected from the cloud 810 or servers 802. A thin client or a zero client can depend on the connection to the cloud 810 or server 802 to provide functionality. A zero client can depend on the cloud 810 or other networks 105 or servers 802 to retrieve operating system data for the client device. The cloud 810 can include back end platforms, e.g., servers 802, storage, and/or server farms or data centers.

The cloud 810 can be public, private, or hybrid. Public clouds can include public servers 802 that are maintained by third parties to the client devices 104 or the owners of the clients. The servers 802 can be located off-site in remote geographical locations as disclosed above or otherwise. Public clouds can be connected to the servers 802 over a public network. Private clouds can include private servers 802 that are physically maintained by client devices 104 or owners of clients. Private clouds can be connected to the servers 802 over a private network 105. Hybrid clouds 808 can include both the private and public networks 105 and servers 802.

The cloud 810 can also include a cloud-based delivery, e.g. Software as a Service (Saas) 812, Platform as a Service (PaaS) 814, and the Infrastructure as a Service (IaaS) 816. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 104 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 104 and server 802 can be deployed as and/or executed on any type and form of computing device, e.g. a computer, network device or appliance capable of communicating on any type and form of network and performing the operations described herein.

Figure 8C:
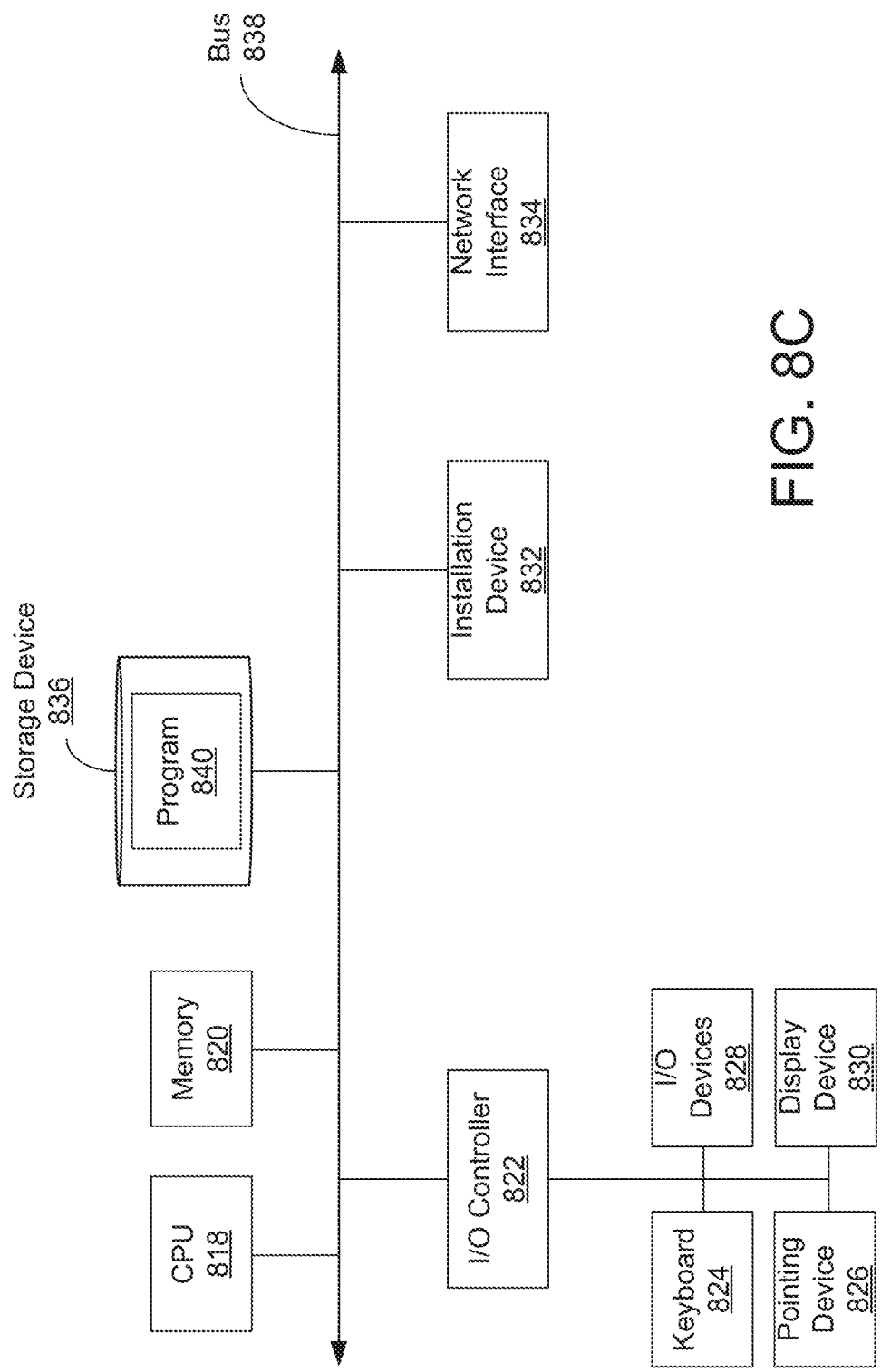
FIG. 8C is a block diagram depicting an implementation of a computing device that can be used in connection with the systems depicted in FIGS. 1-4, 8A, and 8B and the methods depicted in FIGS. 5-7.

FIG. 8C depicts block diagrams of a computing device 803 useful for practicing an embodiment of the client device 104 or a server 802. As shown in FIG. 8C, each computing device 803 can include a central processing unit 818, and a main memory unit 820. As shown in FIG. 8C, a computing device 803 can include one or more of a storage device 836, an installation device 832, a network interface 834, an I/O controller 822, a display device 830, a keyboard 824 or a pointing device 826, e.g. a mouse. The storage device 836 can include, without limitation, a program 840, such as an operating system, software, or software associated with system 100.

The central processing unit 818 is any logic circuitry that responds to and processes instructions fetched from the main memory unit 820. The central processing unit 818 can be provided by a microprocessor unit, e.g.: those manufactured by Intel Corporation of Mountain View, California. The computing device 803 can be based on any of these processors, or any other processor capable of operating as described herein. The central processing unit 818 can utilize instruction level parallelism, thread level parallelism, different levels of cache, and multi-core processors. A multi-core processor can include two or more processing units on a single computing component.

Main memory unit 820 can include one or more memory chips capable of storing data and allowing any storage location to be directly accessed by the microprocessor 818. Main memory unit 820 can be volatile and faster than storage 836 memory. Main memory units 820 can be Dynamic random access memory (DRAM) or any variants, including static random access memory (SRAM). The memory 820 or the storage 836 can be non-volatile; e.g., non-volatile read access memory (NVRAM). The memory 820 can be based on any type of memory chip, or any other available memory chips. In the example depicted in FIG. 8C, the processor 818 can communicate with memory 820 via a system bus 838.

A wide variety of I/O devices 828 can be present in the computing device 803. Input devices 828 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 828 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 828, display devices 830 or group of devices can be augmented reality devices. The I/O devices can be controlled by an I/O controller 822 as shown in FIG. 8C. The I/O controller 822 can control one or more I/O devices, such as, e.g., a keyboard 824 and a pointing device 826, e.g., a mouse or optical pen. Furthermore, an I/O device can also provide storage and/or an installation device 832 for the computing device 803. In embodiments, the computing device 803 can provide USB connections (not shown) to receive handheld USB storage devices. In embodiments, an I/O device 828 can be a bridge between the system bus 838 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 830 can be connected to I/O controller 822. Display devices can include, e.g., liquid crystal displays (LCD), electronic papers (e-ink) displays, flexile displays, light emitting diode displays (LED), or other types of displays. In some embodiments, display devices 830 or the corresponding I/O controllers 822 can be controlled through or have hardware support for OPENGL or DIRECTX API or other graphics libraries. Any of the I/O devices 828 and/or the I/O controller 822 can include any type and/or form of suitable hardware, software, or combination of hardware and software to support, enable or provide for the connection and use of one or more display devices 830 by the computing device 803. For example, the computing device 803 can include any type and/or form of video adapter, video card, driver, and/or library to interface, communicate, connect or otherwise use the display devices 830. In embodiments, a video adapter can include multiple connectors to interface to multiple display devices 830.

The computing device 803 can include a storage device 836 (e.g., one or more hard disk drives or redundant arrays of independent disks) for storing an operating system or other related software, and for storing application software programs 840 such as any program related to the systems, methods, components, modules, elements, or functions depicted in FIG. 1, 2, or 3. Examples of storage device 836 include, e.g., hard disk drive (HDD); optical drive including CD drive, DVD drive, or BLU-RAY drive; solid-state drive (SSD); USB flash drive; or any other device suitable for storing data. Storage devices 836 can include multiple volatile and non-volatile memories, including, e.g., solid state hybrid drives that combine hard disks with solid state cache. Storage devices 836 can be non-volatile, mutable, or read-only. Storage devices 836 can be internal and connect to the computing device 803 via a bus 838. Storage device 836 can be external and connect to the computing device 803 via an I/O device 830 that provides an external bus. Storage device 836 can connect to the computing device 803 via the network interface 834 over a network 105. Some client devices 104 may not require a non-volatile storage device 836 and can be thin clients or zero client devices 104. Some storage devices 836 can be used as an installation device 832 and can be suitable for installing software and programs.

The computing device 803 can include a network interface 834 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 803 can communicate with other computing devices 803 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 834 can include a built-in network adapter, network interface card, PCMCIA network card, EXPRESSCARD network card, card bus network adapter, wireless network adapter, USB network adapter, modem or any other device suitable for interfacing the computing device 803 to any type of network capable of communication and performing the operations described herein.

A computing device 803 of the sort depicted in FIG. 8C can operate under the control of an operating system, which controls scheduling of tasks and access to system resources. The computing device 803 can be running any operating system configured for any type of computing device, including, for example, a desktop operating system, a mobile device operating system, a tablet operating system, or a smartphone operating system.

The computing device 803 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 803 has sufficient processor power and memory capacity to perform the operations described herein. In some embodiments, the computing device 803 can have different processors, operating systems, and input devices consistent with the device.

In embodiments, the status of one or more machines 106, 802 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 803 in response to the CPU 818 executing an arrangement of instructions contained in main memory 820. Such instructions can be read into main memory 820 from another computer-readable medium, such as the storage device 836. Execution of the arrangement of instructions contained in main memory 820 causes the computing device 803 to perform the illustrative processes described herein. One or more processors in a multi-processing arrangement may also be employed to execute the instructions contained in main memory 820. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

At least one aspect of this technical solution is directed to a system. The system may include a network monitoring device connected to a communications network, the network monitoring device configured to monitor network traffic transmitted to and from a domain name system (DNS) server across the communications network and comprising one or more processors coupled with memory, the memory storing executable instructions that, when executed by one or more processors, cause the one or more processors to: store a probabilistic data structure storing one or more domain names; receive a response data packet from the DNS server, the response data packet comprising a first domain name transmitted in a query to the DNS server and an affirmative response code; responsive to identifying the affirmative response code in the response data packet, update the probabilistic data structure with the first domain name identified from the response data packet; responsive to detecting an attack on the network, retrieve a query message transmitted by a computing device intended for the DNS server, the query message containing a second domain name; query the updated probabilistic data structure using the second domain name; and responsive to determining the second domain name is not stored in the updated probabilistic data structure based on the query, restrict transmission of the query message or communication by the computing device with the DNS server.

At least one aspect of this technical solution is directed to a method. The method may include storing, by one or more processors of a network monitoring device connected to a communications network and configured to monitor network traffic transmitted to and from a domain name system (DNS) server across the communications network, a probabilistic data structure storing one or more domain names; receiving, by the one or more processors, a response data packet from the DNS server, the response data packet comprising a first domain name transmitted in a query to the DNS server and an affirmative response code; responsive to identifying the affirmative response code in the response data packet, updating, by the one or more processors, the probabilistic data structure with the first domain name identified from the response data packet; responsive to detecting an attack on the network, retrieving, by the one or more processors, a query message transmitted by a computing device intended for the DNS server, the query message containing a second domain name; querying, by the one or more processors, the updated probabilistic data structure using the second domain name; and responsive to determining the second domain name is not stored in the updated probabilistic data structure based on the query, restricting, by the one or more processors, transmission of the query message or communication by the computing device with the DNS server.

At least one aspect of this technical solution is directed to a system. The system may include a network monitoring device connected to a communications network, the network monitoring device configured to monitor network traffic transmitted to and from a domain name system (DNS) server across the communications network and comprising one or more processors coupled with memory, the memory storing executable instructions that, when executed by one or more processors, cause the one or more processors to: store a probabilistic data structure storing one or more domain names; receive a query message transmitted from the DNS server, the query message comprising a first transaction identifier and source port; update the probabilistic data structure with the first transaction identifier and source port identified from the query message; responsive to detecting an attack on the network, retrieve a response data packet intended for the DNS server, the response data packet comprising a second transaction identifier and destination port; query the updated probabilistic data structure using the second transaction id and destination port; and responsive to determining the second transaction id and destination port are not stored in the updated probabilistic data structure based on the query, restrict transmission of the response data packet.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:
a network monitoring device connected to a communications network, the network monitoring device configured to monitor network traffic transmitted to and from a domain name system (DNS) server across the communications network and comprising one or more processors coupled with memory, the memory storing executable instructions that, when executed by one or more processors, cause the one or more processors to:

maintain two probabilistic data structures storing one or more domain names, wherein a first probabilistic data structure is a current probabilistic data structure and a second probabilistic data structure is a previous probabilistic data structure;

receive a response data packet from the DNS server, the response data packet comprising a first domain name transmitted in a query to the DNS server and an affirmative response code;

responsive to identifying the affirmative response code in the response data packet, update the current probabilistic data structure with the first domain name identified from the response data packet;

periodically delete the previous probabilistic data structure and modify the current probabilistic data structure to be the previous probabilistic data structure, and create a new probabilistic data structure as the current probabilistic data structure;

responsive to detecting an attack on the network, retrieve a query message transmitted by a computing device intended for the DNS server, the query message containing a second domain name;

query the current and previous probabilistic data structures using the second domain name; and responsive to determining the second domain name is not stored in either the current or previous probabilistic data structures based on the query, restrict transmission of the query message or communication by the computing device with the DNS server.

2. The system of claim 1, wherein execution of the instructions causes the one or more processors to store the current and previous probabilistic data structures indicating the one or more domain names in a cuckoo filter or a bloom filter.

3. The system of claim 1, wherein execution of the instructions causes the one or more processors to restrict the query message by dropping the query message instead of forwarding the query message to the DNS server.

4. The system of claim 1, wherein execution of the instructions causes the one or more processors to restrict the communication by the computing device by limiting a rate of traffic transmitted to the computing device or received from the computing device.

5. The system of claim 1, wherein execution of the instructions causes the one or more processors to restrict the communication by the computing device by limiting DNS queries by the computing device.

6. The system of claim 1, wherein execution of the instructions causes the one or more processors to restrict the query message or communication by the computing device by performing DNS authentication or by performing regular expression filtering.

7. The system of claim 1, wherein execution of the instructions further causes the one or more processors to:

responsive to detecting the attack on the network, retrieve a second query message transmitted by a second computing device intended for the DNS server, the second query message containing the first domain name;

query the current and previous probabilistic data structures using the first domain name; and responsive to determining the first domain name is likely stored in either the current or previous probabilistic data structures based on the comparison, forward the query message to the DNS server.

8. The system of claim 1, wherein the current probabilistic data structure is a cuckoo filter, and wherein execution of the instructions further causes the one or more processors to:

monitor response data packets transmitted by the DNS server for a first defined time period, wherein the one or more processors receive the response data packet transmitted by the DNS server during the first defined time period;

identify, based on the monitoring, a second response data packet transmitted to a second computing device, the second response data packet comprising a negative response indicating a third domain name included in a second query message to the DNS server could not be found;

responsive to identifying the negative response in the second response data packet, query the cuckoo filter using the third domain name;

responsive to determining the third domain name is likely stored in the cuckoo filter based on the comparison, delete an entry for the third domain name from the cuckoo filter.

9. The system of claim 1, wherein the response data packet comprises multiple domain names, and wherein execution of the instructions causes the one or more processors to store each of the domain names in the data packet in the current probabilistic data structure.

10. A system comprising:

a network monitoring device connected to a communications network, the network monitoring device configured to monitor network traffic transmitted to and from a domain name system (DNS) server across the communications network and comprising one or more processors coupled with memory, the memory storing executable instructions that, when executed by one or more processors, cause the one or more processors to:

store a probabilistic data structure storing one or more domain names;

receive a response data packet from the DNS server, the response data packet comprising a first domain name transmitted in a query to the DNS server and an affirmative response code;

responsive to identifying the affirmative response code in the response data packet, update the probabilistic data structure with the first domain name identified from the response data packet;

responsive to detecting an attack on the network, retrieve a query message transmitted by a computing device intended for the DNS server, the query message containing a second domain name;

query the updated probabilistic data structure using the second domain name; and responsive to determining the second domain name is not stored in the updated probabilistic data structure based on the query, restrict transmission of the query message or communication by the computing device with the DNS server, wherein execution of the instructions further causes the one or more processors to:

monitor response data packets transmitted by the DNS server for a first defined time period, wherein the one or more processors receive the response data packet transmitted by the DNS server during the first defined time period;

generate the probabilistic data structure from domain names of response data packets transmitted by the DNS server only during the first defined time period;

detect an end to the first defined time period; and responsive to detecting the end to the first defined time period, generate a second probabilistic data structure separate from the probabilistic data structure from domain names of response data packets transmitted by the DNS server only during a second defined time period subsequent to the first defined time period.

11. The system of claim 10, wherein execution of the instructions further causes the one or more processors to:

responsive to detecting the end to the first defined time period:
update a first label of the probabilistic data structure to indicate the probabilistic data structure is a previous probabilistic data structure; and
label the second probabilistic data structure to indicate the second probabilistic data structure is a current probabilistic data structure.

12. The system of claim 10, wherein execution of the instructions further causes the one or more processors to:

in response to determining the first domain name is not stored in the probabilistic data structure, query the second probabilistic data structure using the first domain name; and
restrict transmission of the query message or communication by the computing device with the DNS server responsive to determining neither of the probabilistic data structure or the second probabilistic data structure contains the second domain name.

13. The system of claim 10, wherein execution of the instructions further causes the one or more processors to:

responsive to detecting the end to the first defined time period, delete a third probabilistic data structure having a previous label and generated based on domain names of response data packets transmitted by the DNS server only during a third defined time period immediately previous to the first defined time period.

14. A method comprising:

maintaining, by one or more processors of a network monitoring device connected to a communications network and configured to monitor network traffic transmitted to and from a domain name system (DNS) server across the communications network, two probabilistic data structures storing one or more domain names, wherein a first probabilistic data structure is a current probabilistic data structure and a second probabilistic data structure is a previous probabilistic data structure;

receiving, by the one or more processors, a response data packet from the DNS server, the response data packet comprising a first domain name transmitted in a query to the DNS server and an affirmative response code;

responsive to identifying the affirmative response code in the response data packet, updating, by the one or more processors, the current probabilistic data structure with the first domain name identified from the response data packet;

periodically deleting, by the one or more processors, the previous probabilistic data structure and modify the current probabilistic data structure to be the previous probabilistic data structure, and create a new probabilistic data structure as the current probabilistic data structure;

responsive to detecting an attack on the network, retrieving, by the one or more processors, a query message transmitted by a computing device intended for the DNS server, the query message containing a second domain name;

querying, by the one or more processors, the current and previous probabilistic data structures using the second domain name; and responsive to determining the second domain name is not stored in either the current or previous probabilistic data structures based on the query, restricting, by the one or more processors, transmission of the query message or communication by the computing device with the DNS server.

15. The method of claim 14, wherein storing the current and previous probabilistic data structures indicating the one or more domain names comprises storing, by the one or more processors, the one or more domain names in a cuckoo filter or a bloom filter.

16. The method of claim 14, wherein restricting the query message comprises dropping, by the one or more processors, the query message instead of forwarding the query message to the DNS server.

17. A system comprising:

a network monitoring device connected to a communications network, the network monitoring device configured to monitor network traffic transmitted to and from a domain name system (DNS) server across the communications network and comprising one or more processors coupled with memory, the memory storing executable instructions that, when executed by one or more processors, cause the one or more processors to:

maintain two probabilistic data structures storing one or more transaction identifiers and ports, wherein a first probabilistic data structure is a current probabilistic data structure and a second probabilistic data structure is a previous probabilistic data structure;

receive a query message transmitted from the DNS server, the query message comprising a first transaction identifier and source port;

update the current probabilistic data structure with the first transaction identifier and source port identified from the query message;

periodically delete the previous probabilistic data structure and modify the current probabilistic data structure to be the previous probabilistic data structure, and create a new probabilistic data structure as the current probabilistic data structure;

responsive to detecting an attack on the network, retrieve a response data packet intended for the DNS server, the response data packet comprising a second transaction identifier and destination port;

query the current and previous probabilistic data structures using the second transaction identifier and destination port; and responsive to determining the second transaction identifier and destination port are not stored in either the current or previous probabilistic data structures based on the query, restrict transmission of the response data packet.

18. The system of claim 17, wherein execution of the instructions further causes the one or more processors to:

monitor query messages transmitted by the DNS server for a first defined time period, wherein the one or more processors receive the query messages transmitted from the DNS server during the first defined time period;

generate the probabilistic data structure from transaction identifiers and source ports of the query messages transmitted from the DNS server only during the first defined time period;

detecting an end to the first defined time period; and responsive to detecting the end to the first defined time period, generate a second probabilistic data structure separate from the probabilistic data structure from domain names of query messages transmitted by the DNS server only during a second defined time period subsequent to the first defined time period.

19. The system of claim 18, wherein execution of the instructions causes the one or more processors to:

responsive to determining the transaction identifier and the destination port are not present in the probabilistic data structure, query the second probabilistic data structure using the transaction identifier and the destination port from the response data packet message; and restrict transmission of the response data packet responsive to determining neither of the probabilistic data structure or the second probabilistic data structure contain the transaction identifier and the destination port from the response data packet.

20. The system of claim 18, wherein execution of the instructions further causes the one or more processors to:

responsive to detecting the end to the first defined time period:

update a first label of the probabilistic data structure to indicate the probabilistic data structure is a previous probabilistic data structure; and label the second probabilistic data structure to indicate the second probabilistic data structure is a current probabilistic data structure.

* * * * *